(12) United States Patent
Lee

(10) Patent No.: US 12,086,361 B2
(45) Date of Patent: *Sep. 10, 2024

(54) TOUCH SCREEN CONTROLLER, TOUCH SCREEN DRIVING CIRCUIT INCLUDING THE SAME AND TOUCH SCREEN SYSTEM

(71) Applicant: Samsung Electronics Co., Ltd., Suwon-si (KR)

(72) Inventor: Changju Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,143

(22) Filed: Oct. 31, 2022

(65) Prior Publication Data

US 2023/0050409 A1    Feb. 16, 2023

Related U.S. Application Data

(63) Continuation of application No. 17/318,288, filed on May 12, 2021, now Pat. No. 11,487,386.

(30) Foreign Application Priority Data

Jun. 17, 2020 (KR) .................. 10-2020-0073730

(51) Int. Cl.
   *G06F 3/041* (2006.01)
   *G09G 3/20* (2006.01)
   *G06F 3/044* (2006.01)

(52) U.S. Cl.
   CPC ........ *G06F 3/04182* (2019.05); *G06F 3/0412* (2013.01); *G09G 3/20* (2013.01);
   (Continued)

(58) Field of Classification Search
   CPC .......... G06F 3/0412; G06F 3/041–047; G06F 2203/041–04114; H01L 27/323
   See application file for complete search history.

(56) References Cited

U.S. PATENT DOCUMENTS

| 8,159,133 B2 | 4/2012 | Oh et al. |
| 9,030,441 B2 | 5/2015 | Yumoto et al. |
| (Continued) | | |

FOREIGN PATENT DOCUMENTS

| KR | 10-2012-0063772 A | 6/2012 |
| KR | 10-1487638 B1 | 1/2015 |
| (Continued) | | |

OTHER PUBLICATIONS

Request for the Submission of an Opinion issued Jul. 30, 2024 in Korean Application No. 10-2020-0073730.

*Primary Examiner* — Sanjiv D. Patel
(74) *Attorney, Agent, or Firm* — Harness, Dickey & Pierce, P.L.C.

(57) ABSTRACT

A touch screen controller, a touch screen driving circuit and a touch screen system are provided. The touch screen driving circuit configured to drive a touch screen includes an analog driving circuit configured to provide driving signals to a display panel and a touch panel of the touch screen, and generate a touch sensing value based on a touch sensing signal from the touch panel; a display noise table (DNT) comprising display noise information indicating display noise that varies according to a driving state of the touch screen and image data; a feature extractor configured to extract a plurality of feature values from the driving state and the image data; and a touch processor configured to read a display noise value mapped to the plurality of feature values from the DNT, subtract the display noise value from the touch sensing value and generate a touch value.

18 Claims, 21 Drawing Sheets

(52) U.S. Cl.
CPC ........ *G06F 3/04166* (2019.05); *G06F 3/0446* (2019.05); *G09G 2310/08* (2013.01); *G09G 2360/18* (2013.01)

(56) References Cited

U.S. PATENT DOCUMENTS

| | | |
|---|---|---|
| 9,658,465 B2 | 5/2017 | Matsubara et al. |
| 2004/0160459 A1 | 8/2004 | Fischbeck et al. |
| 2007/0285351 A1 | 12/2007 | Willis |
| 2008/0267537 A1 | 10/2008 | Thuries |
| 2011/0122096 A1 | 5/2011 | Kim et al. |
| 2013/0009888 A1* | 1/2013 | Park .................. G06F 3/0421 345/173 |
| 2014/0152582 A1 | 6/2014 | Agarwal et al. |
| 2018/0136778 A1* | 5/2018 | Choi .................. G06F 3/044 |
| 2019/0258351 A1 | 8/2019 | Rasti |

FOREIGN PATENT DOCUMENTS

| | | |
|---|---|---|
| KR | 10-1496183 B1 | 2/2015 |
| KR | 10-2016-0143067 A | 12/2016 |
| KR | 10-2017-0102272 A | 9/2017 |
| KR | 10-2019-0101854 A | 9/2019 |

\* cited by examiner

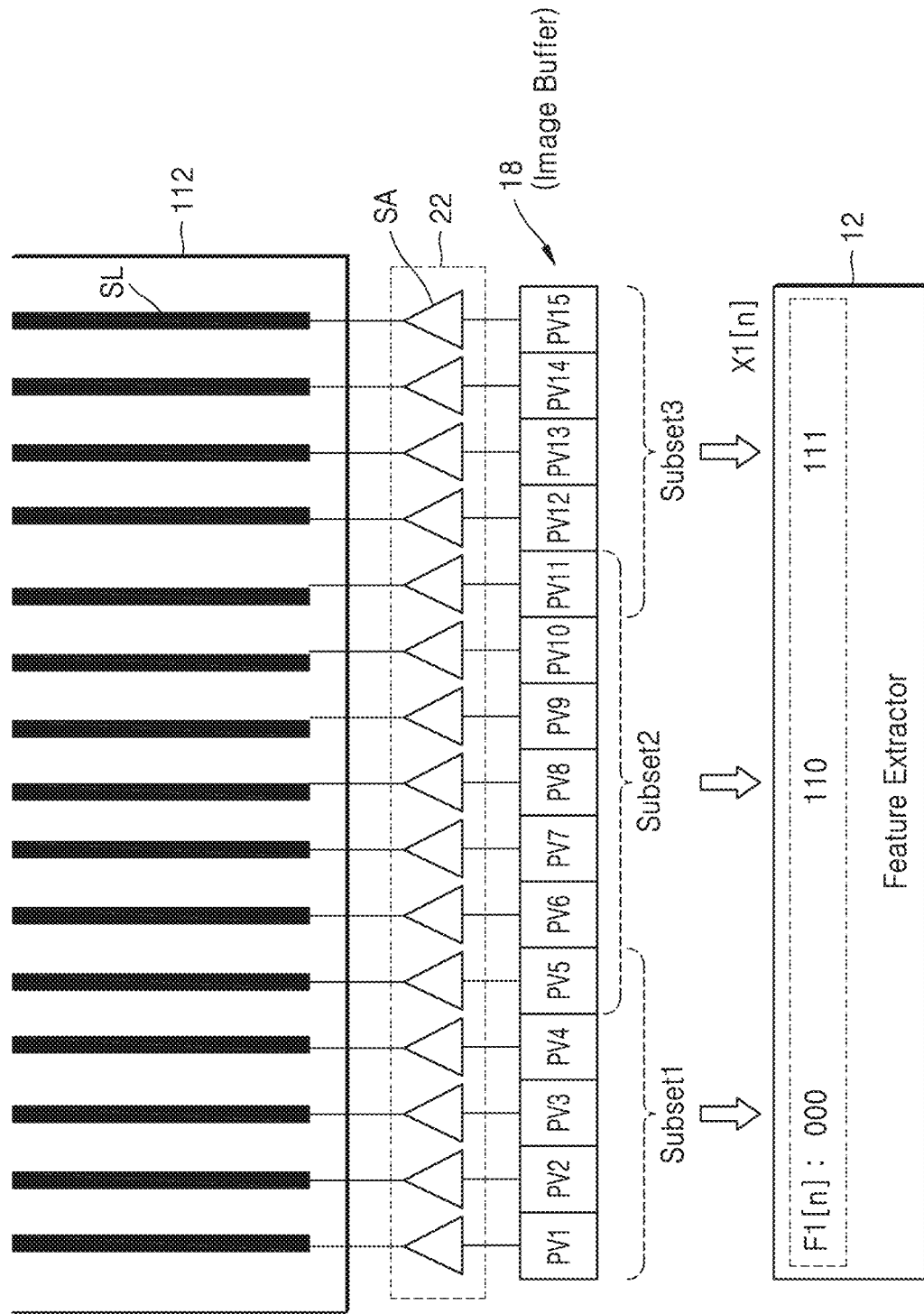

FIG. 6A

| F[n] | DNV |
|---|---|
| Display Noise Table | |
| 000 000 000 | 4 |
| 000 000 001 | 5 |
| ⋮ | ⋮ |
| 000 001 000 | 16 |
| 000 001 001 | 20 |
| 000 001 010 | 22 |
| ⋮ | ⋮ |
| 000 111 111 | 27 |
| 001 000 001 | 28 |
| ⋮ | ⋮ |
| 111 111 111 | 40 |

FIG. 6B

Display Noise Table (11b)

| F2[n] | F1[n] | DNV |
|---|---|---|
| 00<br>(High Temp.) | 000 000 000 | 4 |
| | 000 000 001 | 5 |
| | ⋮ | ⋮ |
| | 111 111 111 | 10 |
| 01<br>(Room Temp.) | 000 000 000 | 15 |
| | 000 000 001 | 16 |
| | ⋮ | ⋮ |
| | 111 111 111 | 40 |
| 10<br>(Low Temp.) | 000 000 000 | 50 |
| | 000 000 001 | ⋮ |
| | ⋮ | 78 |
| | 111 111 111 | 79 |

FIG. 6C

| F[n] | DNV |
|---|---|
| Display Noise Table | |
| 0000 | 4 |
| 0010 | 5 |
| 0100 | 16 |
| 0110 | 20 |
| ⋮ | ⋮ |
| 1100 | 38 |
| 1111 | 40 |

| F[n] | DNV | COFF (C2, C1) |
|---|---|---|
| 0000 | 4 | – |
| 0100 | 5 | 2, 0 |
| 0110 | 16 | 3, 4 |
| 1111 | 20 | 0, 1 |

Display Noise Table — 11d ically stacked or may share at least one layer and may be formed integrally. Recently, the display panel has been very thin. As the distance between the display panel and the touch panel is very close, the capacitance between electrodes of the two panels may increase, and accordingly, noise caused by signals driven for display operation in a touch sensing signal, that is, display noise, may increase. In addition, as the frame refresh rate of the touch panel increases, the display noise may increase in the touch sensing signal. When the display noise increases in the touch sensing signal, touch sensing performance may deteriorate.

TOUCH SCREEN CONTROLLER, TOUCH SCREEN DRIVING CIRCUIT INCLUDING THE SAME AND TOUCH SCREEN SYSTEM

CROSS-REFERENCE TO RELATED APPLICATION

This application is a continuation of and claims the benefit of priority under 35 U.S.C. §§ 120/121 to U.S. patent application Ser. No. 17/318,288, filed on May 12, 2021, which claims the benefit of Korean Patent Application No. 10-2020-0073730, filed on Jun. 17, 2020, in the Korean Intellectual Property Office, the disclosures of each of which are incorporated by reference herein in their entirety.

BACKGROUND

The inventive concepts relate to a touch screen controller, and more particularly to, a touch screen controller, a touch screen driving circuit including the touch screen controller, and a touch screen system A touch screen may include a display panel for image display and a touch panel for touch sensing, and the display panel and the touch panel may be vertically stacked or may share at least one layer and may be formed integrally. Recently, the display panel has been very thin. As the distance between the display panel and the touch panel is very close, the capacitance between electrodes of the two panels may increase, and accordingly, noise caused by signals driven for display operation in a touch sensing signal, that is, display noise, may increase. In addition, as the frame refresh rate of the touch panel increases, the display noise may increase in the touch sensing signal. When the display noise increases in the touch sensing signal, touch sensing performance may deteriorate.

SUMMARY

The inventive concepts provide a touch screen controller that reduces display noise included in a touch signal when driving a touch screen, a touch screen driving circuit including the touch screen controller and a touch screen system.

According to an aspect of the inventive concepts, there is provided a touch screen driving circuit configured to drive a touch screen including a display panel and a touch panel including an analog driving circuit configured to provide driving signals to the display panel and the touch panel, and generate a touch sensing value based on a touch sensing signal received from the touch panel; a display noise table (DNT) including display noise information indicating display noise that varies according to a driving state of the touch screen and image data; a feature extractor configured to extract a plurality of feature values from the driving state of the touch screen and the image data; and a touch processor configured to read a display noise value mapped to the plurality of feature values from the DNT, subtract the display noise value from the touch sensing value and generate a touch value.

According to an aspect of the inventive concepts, there is provided a touch screen controller. The touch screen controller includes a display noise table (DNT) storing a plurality of display noise values according to image data displayed on a touch screen, a feature extractor configured to extract a feature value from current image data to be displayed on the touch screen, a DNT controller configured to output a display noise value corresponding to the feature value from the DNT based on the feature value, and a processor configured to generate a touch value from which display noise is removed based on the display noise value.

According to an aspect of the inventive concepts, there is provided a touch screen driving circuit configured to drive a touch screen including a display panel and a touch panel. The touch screen driving circuit includes a display noise table (DNT) comprising display noise information indicating display noise that varies according to image data displayed on the touch screen, a feature extractor configured to extract a feature value from the image data displayed on the touch screen, and a touch processor configured to read a display noise value mapped to the feature value from the DNT, subtract the display noise value from a touch sensing value generated based on a sensing value received from the touch panel, and generate a touch value with reduced display noise.

According to an aspect of the inventive concepts, there is provided a touch screen system. The touch screen system includes a touch screen including a display panel and a touch panel, and a touch screen driving circuit configured to drive the touch screen, wherein the touch screen driving circuit includes a display noise table (DNT) storing display noise information obtained by previously measuring a plurality of display noise values according to at least one of image data displayed on the touch screen and a driving state of the touch screen in a database, a feature extractor configured to extract a feature value from at least one of current image data to be displayed on the touch screen and a current driving state of the touch screen, a DNT controller configured to output a display noise value corresponding to the feature value from the DNT based on the feature value and a processor configured to generate a touch value from which display noise is removed based on the display noise value.

BRIEF DESCRIPTION OF THE DRAWINGS

Example embodiments of the inventive concepts will be more clearly understood from the following detailed description taken in conjunction with the accompanying drawings in which:

FIGS. 5A and 5B illustrate a method of extracting a feature value according to example embodiments of the inventive concepts;

FIGS. 6A to 6E illustrate implementation examples of display noise tables (DNTs) according to example embodiments of the inventive concepts;

DETAILED DESCRIPTION OF EXAMPLE EMBODIMENTS

Hereinafter, example embodiments of the inventive concepts will be described in detail with reference to the accompanying drawings.

Figure 1:
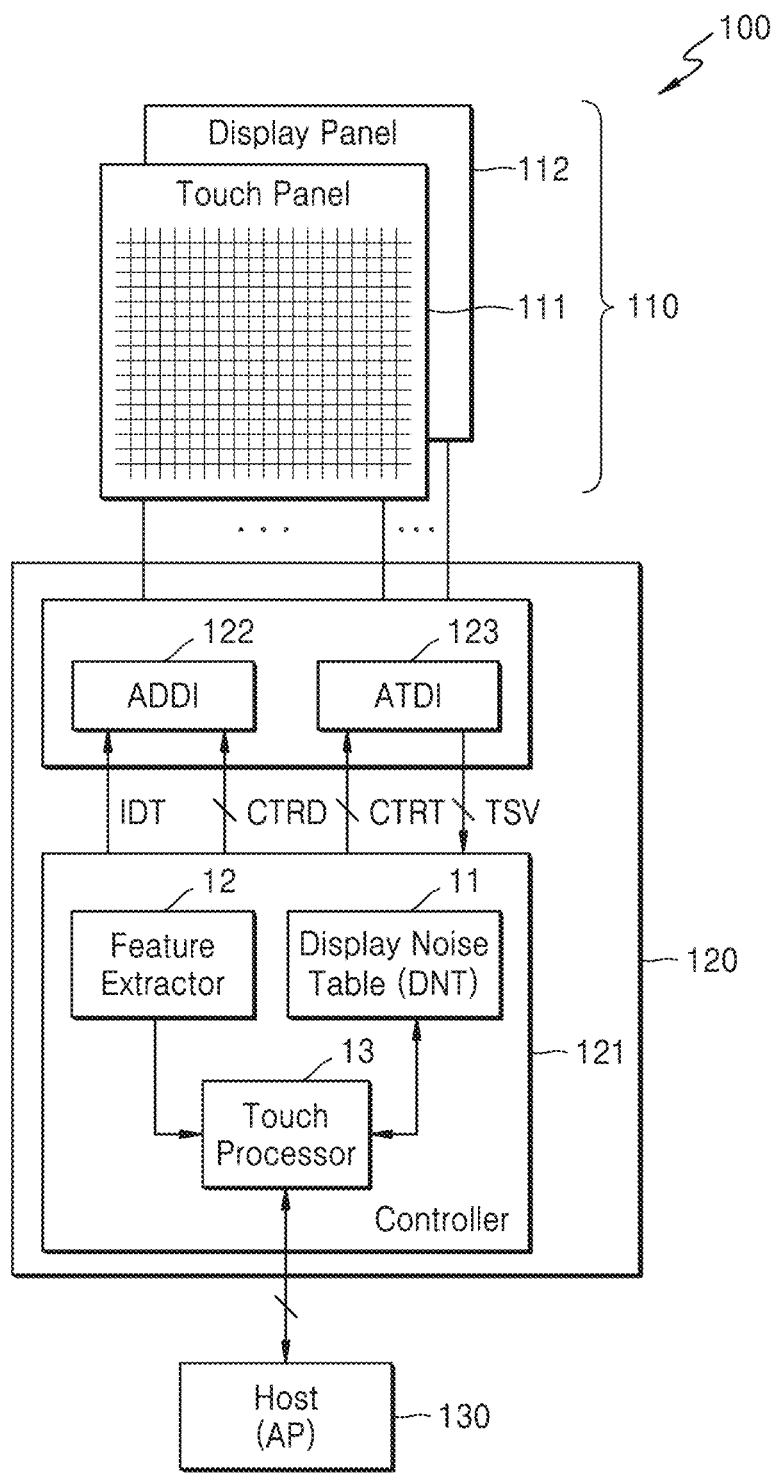
FIG. 1 is a block diagram illustrating a touch screen system according to example embodiments of the inventive concepts.

FIG. 1 is a block diagram illustrating a touch screen system 100 according to example embodiments of the inventive concepts.

The touch screen system 100 may be mounted on various electronic devices. For example, the touch screen system 100 may be mounted on an electronic device such as a personal computer, a network server, a tablet personal computer (PC), an e-reader, a personal digital assistant (PDA), a portable multimedia player (PMP), a mobile phone, a smart phone, a wearable device, an Internet of Things (IoT) device, a refrigerator, a navigation device, etc. In addition, the touch screen system 100 may be mounted on an electronic device provided as a component in a vehicle, furniture, manufacturing facility, a door, various measuring devices, etc.

Referring to FIG. 1, the touch screen system 100 may include a touch screen 110 and a driving circuit 120 for driving the touch screen 110, and the touch screen 110 may include a touch panel 111 (or a touch sensor) and a display panel 112. Accordingly, the touch screen system 100 may provide touch sensing and display functions. In FIG. 1, the touch screen system 100 may further include a host 130, but is not limited thereto, and the host 130 may also be defined as a subject disposed outside the touch screen system 100 to perform communication with the touch screen system 100.

The touch screen 110 may display an image and may receive a touch input of a user. The touch screen 110 may operate as an input/output device of an electronic device. In example embodiments, the touch screen 110 may further include a fingerprint sensor, and the touch screen system 100 may perform fingerprint recognition.

The touch panel 111 may sense a touch (or a touch input) on the touch screen 110 and output a sensing signal resulting from touch sensing. In some example embodiments, the touch may include not only a direct contact of a conductive object (for example, a user's finger, a user's palm, a touch pen, a stylus pen, etc.) on the touch screen 110, but also an approach of the conductive object to the touch screen 110.

The touch panel 111 may include sensing electrodes for providing sensing signals resulting from various types of touch sensing, and as an example, the sensing electrodes may provide sensing signals according to a capacitive touch method.

The display panel 112 may include a plurality of gate lines, a plurality of source lines, and a plurality of pixels arranged in a matrix at a point where the plurality of gate lines and the plurality of source lines cross. The plurality of pixels may display an image based on image signals received through the plurality of source lines and the plurality of gate lines. The display panel 112 may be implemented as one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), and may be implemented as another type of a flat panel or a flexible panel.

In example embodiments, the touch panel 111 and the display panel 112 are separate components in FIG. 1, but example embodiments of the inventive concepts are not necessarily limited thereto. For example, the touch panel 111 may be implemented as an in-cell type panel in which sensing electrodes and a display pixel are combined. In some example embodiments, the sensing electrodes of the touch panel 111 may include one of one or more elements constituting the display pixel, for example, a source line, a gate line, an anode pixel electrode, and a cathode pixel electrode. Alternatively, a common electrode of the display panel 112 may be used as the sensing electrodes. Alternatively, according to various example embodiments, the touch panel 111 may be of an on-cell type panel in which the sensing electrodes are disposed on the display panel 112.

The driving circuit 120 may include circuits that drive and control the touch panel 111 and the display panel 112 of the touch screen 110. The driving circuit 120 may include a touch screen controller 121 (hereinafter referred to as a controller), an analog display driving circuit (ADDI) 122, and/or an analog touch driving circuit (ATDI) 123.

The controller 121 may include digital circuits, and the ADDI 122 and the ATDI 123 may include analog circuits. For example, the ATDI 123 may include analog circuits that drive the sensing electrodes of the touch panel 111, receive and analog-to-digital convert the sensing signal, and may be referred to as an analog front end (AFE). The ADDI 122 may include a driving circuit that drives the gate lines and the source lines (or data lines) of the display panel 112 and may be referred to as a display analog driver.

The ADDI 122 may receive image data IDT and at least one display control signal CTRD from the controller 121, and display the image data IDT on the display panel 112 based on the at least one display control signal CTRD. For example, the at least one display control signal CTRD may include a timing signal, such as a vertical synchronization signal and a horizontal synchronization signal. The ATDI 123 may receive at least one touch control signal CTRT from the controller 121, drive and sense the touch panel 111 based on the at least one touch control signal CTRT, and provide touch sensing values TSV according to the sensing signals to the controller 121.

The controller 121 may include a display noise table (DNT) 11, a feature extractor 12, and/or a touch processor 13, and may further include digital circuits that calculate touch coordinates using touch data, for example, touch values with respect to a plurality of points on the touch panel 111, and digital circuits that determine driving timings of the source lines and the gate lines, and perform various processes, such as storing the image data IDT and improving image quality.

The DNT 11 may include display noise information representing display noise that changes according to at least one variable condition such as the image data IDT displayed on the display panel 112 and/or a driving state of the touch screen 110. As the variable condition changes, a plurality of display noises according to a plurality of values of the variable condition may be measured in advance, and the display noise information indicating the plurality of display noises may be stored in the DNT 11. In example embodiments, the plurality of display noises may be measured at the manufacturing stage of the touch screen system 100 or may be periodically or aperiodically measured during the use process of the touch screen system 100.

For example, the DNT 11 may include a plurality of display noise values corresponding to a plurality of values that at least one variable condition (e.g., the image data IDT) may have.

In example embodiments, the DNT 11 may include the plurality of display noise values corresponding to values extracted as feature values from among the plurality of values that the at least one variable condition may have. Accordingly, the amount of data included in the DNT 11 may be reduced. For example, when the plurality of values are grouped into a plurality of groups, the feature value may be a representative value of each of the plurality of groups.

In example embodiments, the plurality of display noise values may be expressed as an equation or the function, and the DNT 11 may include a parameter of the equation or the function. For example, the parameter may include the order of the function and the coefficient of each order, or weights used in the equation.

In example embodiments, the DNT 11 may include reference display noise values corresponding to some reference values among the plurality of values of the at least one variable condition. In example embodiments, the DNT 11 may include a parameter of an equation or a function representing display noises between the reference display noise values, together with the reference display noise values.

In example embodiments, the DNT 11 may be stored in a nonvolatile memory outside or inside the driving circuit 120, such as a NAND flash, a separate nonvolatile memory, such as a resistive memory such as a flash memory, a resistive RAM (ReRAM), a phase change RAM (PRAM), and the like, and when the touch screen system 100 is booted, may be loaded in a high-speed storage region inside the driving circuit 120, such as static random access memory (SRAM), a dynamic RAM (DRAM), and the like from the nonvolatile memory.

The feature extractor 12 may extract a feature value from the image data IDT to be displayed on the display panel 112 and/or the driving state of the touch screen 110. The plurality of values that the at least one variable condition may have may be grouped into a plurality of ranges, and the feature extractor 12 may extract a value representing one of the plurality of ranges from the image data IDT and/or the driving state of the touch screen 110 and the extracted value may be referred to as a feature value.

For example, a plurality of grayscales represented by a pixel value are grouped into a plurality of grayscale ranges, and the DNT 11 may include values representing the plurality of grayscale ranges and display noise values corresponding to the values. For example, the pixel value may represent first to 256th grayscales, the first to 256th grayscales may be grouped into eight grayscale ranges, and the DNT 11 may include eight display noise values corresponding to the eight grayscale ranges.

In some example embodiments, the size of the DNT 11 may be reduced compared to an example where the DNT 11 may include 256 display noise values respectively corresponding to 256 grayscales. The feature extractor 12 may extract a specific grayscale for selecting one of the eight grayscale ranges as the feature value based on the image data IDT.

In example embodiments, when the DNT 11 may include a plurality of display noises corresponding to each of a plurality of variable conditions or a combination of the plurality of variable conditions, the feature extractor 12 may extract a plurality of feature values corresponding to the plurality of variable conditions by extracting the feature value with respect to each of the plurality of variable conditions.

The touch processor 13 may read the feature value or a display noise value mapped to a plurality of feature values from the DNT 11, subtract the display noise value from a touch sensing value (TSV) received from the ATDI 123 and generate a touch value from which display noise is removed. In example embodiments, the touch processor 13 may generate a plurality of touch values corresponding to a plurality of points of the display panel 112 and calculate a touch coordinate based on a plurality of touch values, that is, touch data.

In example embodiments, the driving circuit 120 may be implemented as a single semiconductor chip. In other example embodiments, the controller 121, the ADDI 122, and the ATDI 123 may be implemented as separate semiconductor chips, and each may be implemented as one or more semiconductor chips. In other example embodiments, the ADDI 122 and the ATDI 123 may be implemented as the same semiconductor chip. In other example embodiments, the ADDI 122 and circuits related to driving of the display panel 112 of the controller 121 may be implemented as a first semiconductor chip (or a first semiconductor module including one or more semiconductor chips), the ATDI 123 and circuits related to driving and sensing of the touch panel 111 of the controller 121 may be implemented as one or more other second semiconductor chips (or a second semiconductor module including one or more semiconductor chips), and the feature extractor 12 may be provided in the first semiconductor chip or may be provided in each of the first semiconductor chip and the second semiconductor chip. The host 130 may perform an overall control operation on the touch screen system 100, and as an example, perform various control operations of generating and providing data related to a display operation to the driving circuit 120, or receiving a result of touch recognition, for example, whether a touch has occurred and a touch coordinate and using the result of touch recognition and touch coordinate.

As an implementation example, the host 130 may include an application processor (AP), and the AP may be implemented as a system on chip (SoC). The SoC may include a system bus (not shown) to which a protocol having a predetermined or alternatively, desired standard bus specification is applied, and may include various Intellectual Properties (IPs) connected to the system bus. As the standard specification of the system bus, various types of specifications such as Advanced Microcontroller Bus Architecture (AMBA) protocol of Advanced RISC Machine (ARM) may be applied.

In some example embodiments of a mobile device such as a smartphone or a foldable phone, the thickness of the display panel 112 is further thinner in order to expand a display form factor or a battery space, and the touch screen 110 including the display panel 112 is larger. For this reason, display noise generated by driving of the display panel 112 is increasing. When the display noise increases, the signal to noise ratio (SNR) feature of the touch sensing value may deteriorate, and the touch sensing performance may deteriorate.

The display noise has a feature that a noise source is deterministic, and an inflow path of the display noise does not change over time. For example, the display noise may vary according to the image data IDT and the driving state, but in the same image data and driving state, the display noise may be the same or similar.

The touch screen system 100 according to example embodiments of the inventive concepts may remove the display noise from the touch sensing value based on the feature of the display noise described above. The touch screen system 100 may convert the plurality of display noises measured based on the at least one variable condition causing the display noise into data, store the data in the DNT 11 as display noise information in advance, read or calculate the display noise value corresponding to the image data IDT and/or the driving state of the touch screen 110 from the DNT 11 in real time, subtract the display noise value from the touch sensing value, and generate the touch value from which display noise is removed. Accordingly, the touch sensing performance of the touch screen system 100 may be improved.

Figure 2:
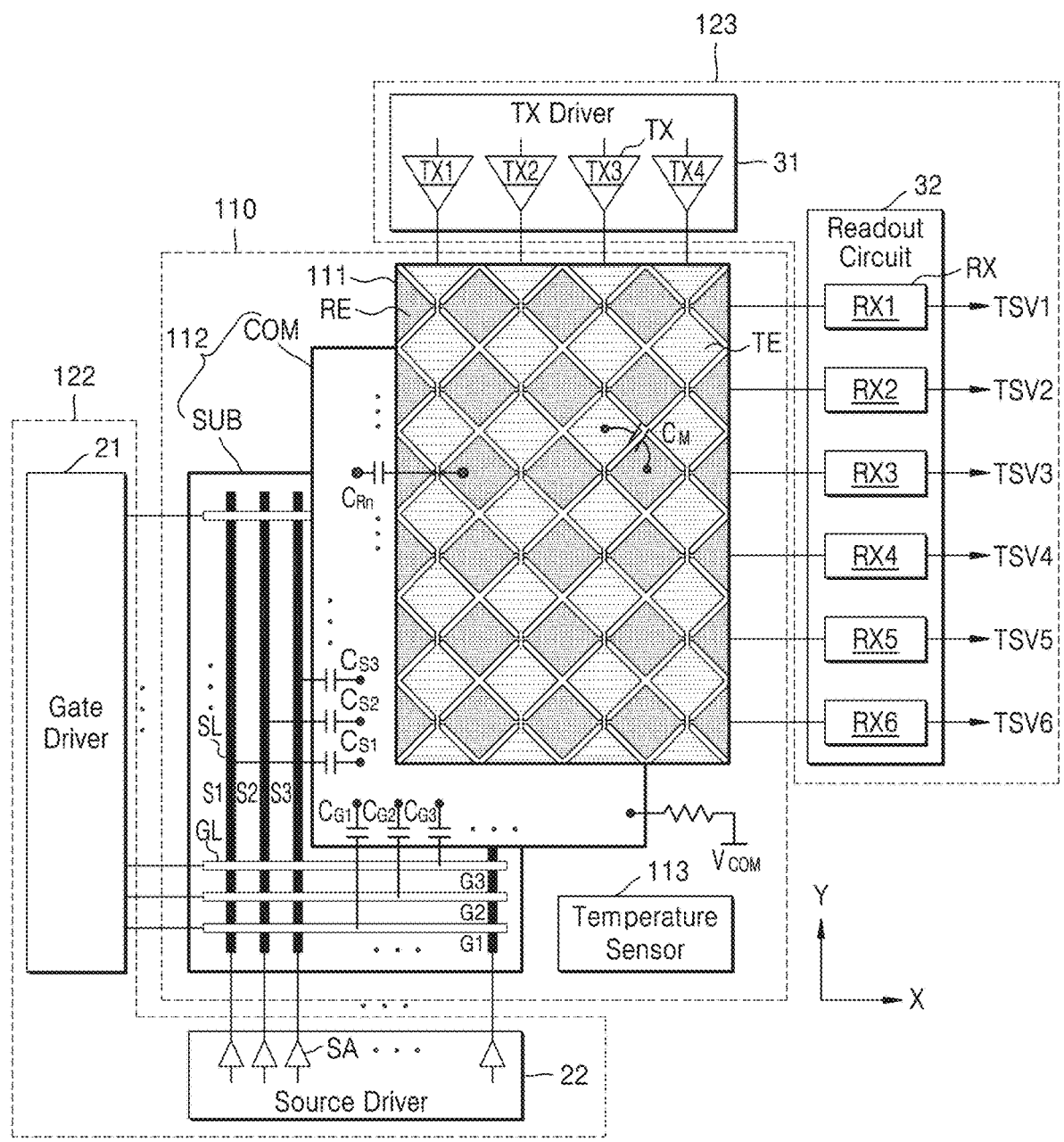
FIG. 2 illustrates in more detail a touch screen, a an analog display driving circuit (ADDI), and an analog touch driving circuit (ATDI) that are provided in a touch screen system according to example embodiments of the inventive concepts.

FIG. 2 illustrates in more detail the touch screen 110, the ADDI 122, and the ATDI 123 provided in the touch screen system 100 according to example embodiments of the inventive concepts.

Referring to FIG. 2, the touch screen 110 may include the touch panel 111 and the display panel 112, and the touch screen 110 may further include a temperature sensor 113. The ATDI 123 may include a transmission driver 31 and a readout circuit 32 for driving and sensing the touch panel 111, and the ADDI 122 may include a gate driver 21 and a source driver 22 for driving the display panel 112.

The touch panel 111 may include a plurality of driving electrodes TE and a plurality of receiving electrodes RE, which may be referred to as a plurality of sensing electrodes. A mutual capacitance $C_M$ may be formed between the driving electrode TE and the receiving electrode RE.

In example embodiments, the plurality of driving electrodes TE may extend in a column direction (e.g., a Y-axis direction) or a row direction (e.g., in an X-axis direction), and the plurality of receiving electrodes RE may extend in a row direction or a column direction. In order to improve a touch sensing feature, the plurality of sensing electrodes, such as the plurality of driving electrodes TE and/or the plurality of receiving electrodes RE, may have a specific shape (for example, a rhombus shape as shown in FIG. 2) or a pattern.

The transmission driver 31 may include a plurality of transmitters TX1 to TX4, and the transmitters TX1 to TX4 may sequentially provide driving signals to the plurality of driving electrodes TE respectively.

The readout circuit 32 may include a plurality of receivers RX1 to RX6, and the plurality of receivers RX1 to RX6 may receive a plurality of sensing signals from the plurality of receiving electrodes RE. Each of the plurality of receivers RX1 to RX6 may be connected to a corresponding one receiving electrode RE to receive a sensing signal or connected to at least two receiving electrodes RE time-divisionally to receive at least two sensing signals.

The sensing signal may represent the mutual capacitance $C_M$ between the driving electrode TE to which the driving signal is applied and the receiving electrode RE in which the sensing signal is received. For example, when a touch occurs on a point on the touch panel 111, the mutual capacitance $C_M$ of the point may be reduced.

The receiver RX may generate a touch sensing value by amplifying and analog to digital converting the received sensing signal. The plurality of receivers RX1 to RX6 may generate a plurality of touch sensing values TSV1 to TSV6 representing the mutual capacitance $C_M$ between the driving electrode TE to which the driving signal is applied and the plurality of receiving electrodes RE.

In example embodiments, the touch panel 111 may include the plurality of sensing electrodes each operating as a driving electrode and a sensing electrode. The plurality of sensing electrodes may be arranged in a row, and each of the plurality of sensing electrodes may be referred to as a dot sensor. In order to provide the driving signal to each of a plurality of dot sensors and to receive the sensing signal, the transmitter TX and the receiver RX may be integrally implemented.

The display panel 112 may include the plurality of gate lines GL, the plurality of source lines SL, and a common electrode COM formed on a substrate SUB, and the common electrode COM may be interposed between the substrate SUB and the touch panel 111. A common voltage Vcom may be applied to the common electrode COM. The common voltage Vcom may be a voltage of a certain level, and may be, for example, a ground voltage.

The gate driver 21 may sequentially drive the plurality of gate lines GL by sequentially providing gate signals (e.g., G1, G2, and G3) of an active level to the plurality of gate lines GL.

The source driver 22 may include a plurality of source amplifiers SA (or referred to as a channel amplifier), and the plurality of source amplifiers SA may provide image signals to the plurality of source lines SL. The source amplifier SA may provide an image signal to the corresponding source line SL among the plurality of source lines SL such that the plurality of source amplifiers SA may simultaneously provide image signals to the plurality of source lines SL. In example embodiments, the source amplifier SA may provide image signals to two or more source lines SL time-divisionally.

When the gate signal of the active level is applied to the corresponding gate line GL, each of a plurality of pixels (not shown) connected between the plurality of gate lines GL and the plurality of source lines SL may output a light signal based on an image signal (e.g., a gray voltage) received through the corresponding source line SL Accordingly, the display panel 110 may display an image.

A parasitic capacitance (e.g., capacitances CG1, CG2, and CG3) may be formed between the gate lines GL and the common electrode COM, and parasitic capacitances (e.g., capacitances CS1, CS2, and CS3) may be formed between the source lines SL and the common electrode COM. In addition, a parasitic capacitance (e.g., capacitance $C_R$) may be formed between the common electrode COM and the plurality of sensing electrodes RE and TX.

Because the common electrode COM is disposed on the display panel 112, the thickness of the common electrode COM may be thin such that light emitted from the pixel may be transmitted. Therefore, it may be difficult to sufficiently reduce a resistance value of the common electrode COM, and when the potential of the source line SL or the gate line GL is toggled, a resulting noise component does not quickly escape due to an RC delay, and the potential of the common electrode COM changes. A part of a change signal of the common electrode COM may flow into the sensing electrode (the receiving electrode RE or the driving electrode TE) of the touch panel 111 and may be recognized as a display noise component of the touch sensing signal.

Recently, as the thickness of the display panel 112 decreases, the capacitance between the common electrode COM and the gate line GL, the capacitance between the common electrode COM and the source line SL, and the capacitance between the common electrode COM and the sensing electrode (the driving electrode TE or the sensing electrode RE) of the touch panel 111 may increase. Accordingly, the potential of the common electrode COM may easily change as the potential of the source line SL or the gate line GL is toggled, and the change signal may easily flow into the sensing electrode, which may increase the display noise component of the touch sensing signal.

Figure 3A:
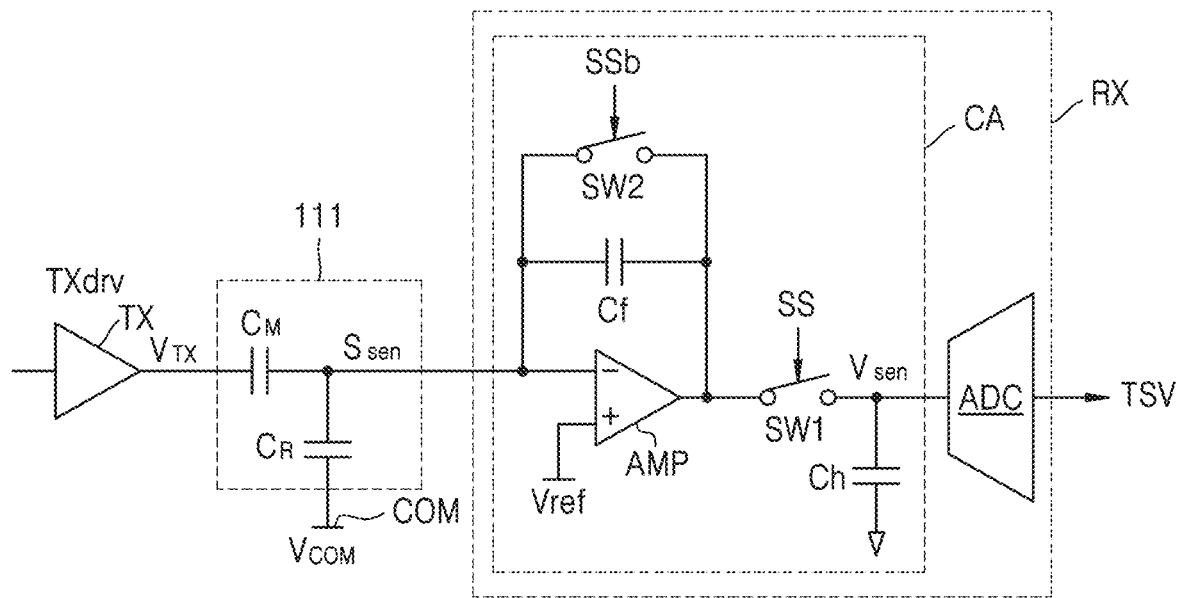
FIG. 3A is a diagram illustrating a touch sensing signal reception and a sampling path.
Figure 3B:
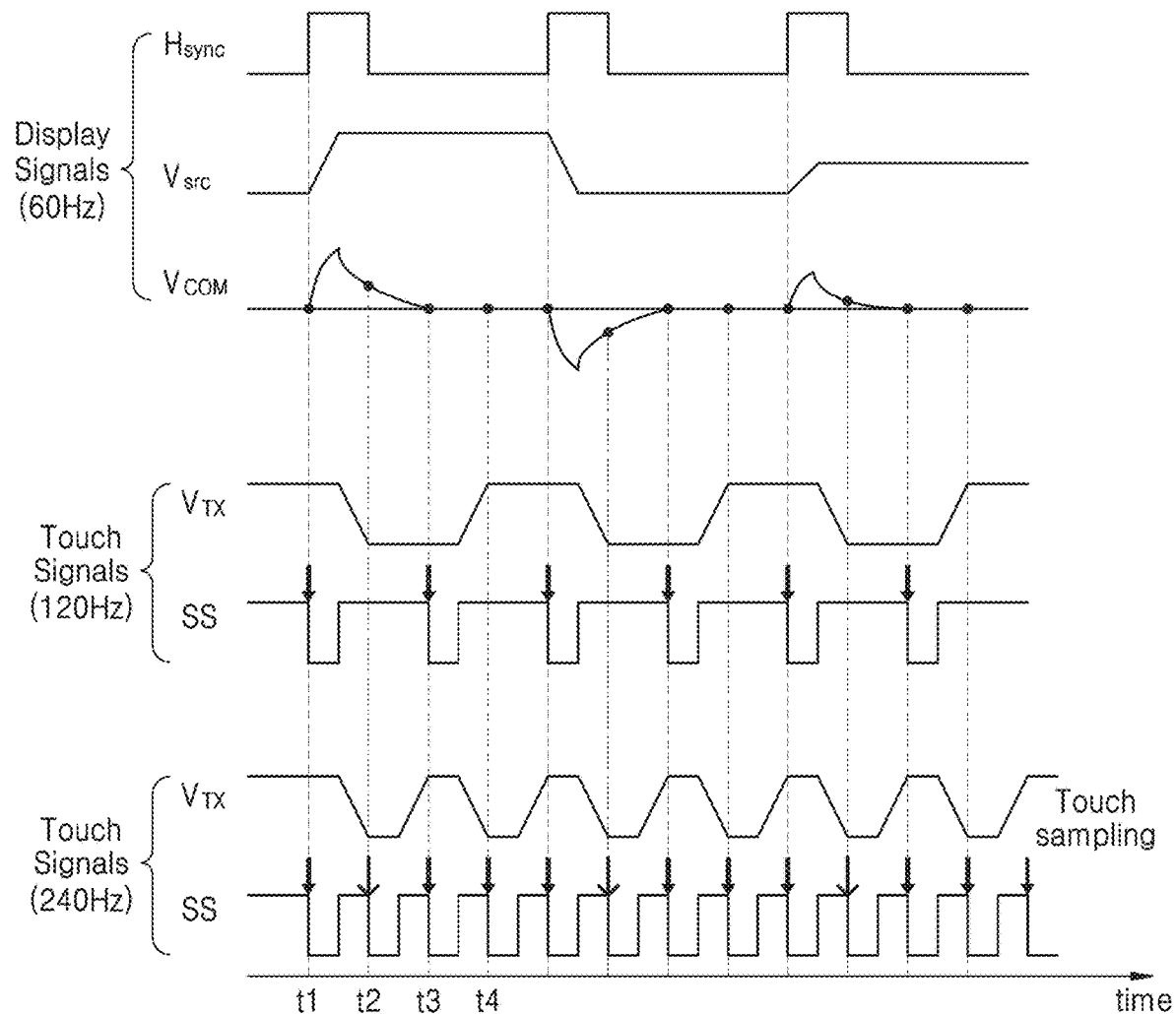
FIG. 3B is a timing diagram illustrating touch sensing signal sampling in a receiver.

FIG. 3A is a diagram illustrating a touch sensing signal reception and a sampling path, and FIG. 3B is a timing diagram illustrating touch sensing signal sampling in the receiver RX.

Referring to FIG. 3A, when the transmitter TX applies a driving voltage $V_{TX}$, such as a constant voltage pulse, to a driving electrode (TE in FIG. 2) of the touch panel 111, the mutual capacitance $C_M$ may be formed between the driving electrode TE and the receiving electrode RE of FIG. 2, and the receiving electrode RE may collect charges corresponding to a driving voltage $V_{TX}$. The receiver RX may receive a sensing signal SS corresponding to the charges collected through the receiving electrode RE, and generate the touch sensing value TSV from a sensing signal Ssen.

The receiver RX may include the charge amplifier CA and an analog-to-digital converter ADC. The charge amplifier CA may convert a sensing signal Ssen, which is a current signal, into a sensing voltage Vsen, which is a voltage signal. Accordingly, the charge amplifier CA may be referred to as a Q-V converter or a capacitance-voltage converter. In example embodiments, the charge amplifier CA may integrate a plurality of sensing signals Ssen which are sequentially received, and convert the integrated sensing signals Ssen into a sensing voltage Vsen, or integrate (accumulate) a plurality of sensing voltages Vsen generated by converting the plurality of sensing signals Ssen. In example embodiments, the receiver RX may further include a circuit for removing the display noise component from the sensing signal Ssen.

The charge amplifier CA may include an amplifier AMP, a feedback capacitor Cf, a first switch SW1, and/or a holding capacitor Ch, and convert the sensing signal Ssen into the sensing voltage Vsen based on a reference voltage Vref.

The first switch SW1 may be turned on in response to an active level of the switching signal SS, such as logic high, to connect an output terminal of the amplifier AMP to the holding capacitor Ch. Accordingly, the output of the amplifier AMP, that is, the sensing voltage Vsen, may be stored in the holding capacitor Ch. Accordingly, a time at which the first switch SW1 is turned off may be referred to as a sampling time.

When the first switch SW1 is turned off, the analog-to-digital converter ADC may convert the sensing voltage Vsen into the touch sensing value TSV. In example embodiments, the analog-to-digital converter ADC may convert the sensing voltage Vsen into the touch sensing value TSV whenever the first switch SW1 is turned off. In other words, the analog-to-digital converter ADC may convert the sensing voltage Vsen into the touch sensing value TSV at each sampling time. In other example embodiments, the sensing voltage Vsen stored in the holding capacitor Ch may be converted into the touch sensing value TSV. In other words, the analog-to-digital converter ADC may convert the accumulated sensing voltage Vsen into the touch sensing value TSV via sampling a plurality of times.

In example embodiments, the charge amplifier CA may further include a second switch SW2, and the second switch SW2 may be turned on and off in response to a switching bar signal SSb of which phase is opposite to that of the sensing signal SS. When the first switch SW1 is turned off, the second switch SW2 may be turned on to discharge the feedback capacitor Cf.

The parasitic capacitance $C_R$ is formed between the receiving electrode RE or the driving electrode TE and the common electrode COM of the display panel (112 in FIG. 2). When a noise signal due to a display operation flows into the common voltage Vcom applied to the common electrode COM, the noise signal may flow into the sensing signal Ssen through the parasitic capacitance $C_R$.

Referring to FIG. 3B, during the display operation, the source amplifier (SA in FIG. 2) may output an image signal, for example, a source voltage Vsrc, in synchronization with a horizontal synchronization signal Hsync. Accordingly, the common voltage Vcom may change.

The sensing voltage Vsen may be sampled at a time when the driving voltage VTX is applied to the driving electrode TE and the switching signal SS is switched to an inactive level, for example, logic low. In other words, touch sampling may be performed.

At this time, when a frame rate (or referred to as a frame refresh rate) of a touch panel is low, for example, when a touch sensing frame rate is twice or less than a display frame rate, touch sampling may be performed at a time when the common voltage Vcom does not change such as times t1 and t3. However, when the touch sensing frame rate increases, for example, when the touch sensing frame rate is twice or more than the display frame rate, touch sampling may be performed at a time when the common voltage Vcom greatly changes such as the time t2. Therefore, the amount of display noise increases with the sensing voltage Vsen.

As described above, as the touch sensing frame rate increases, the amount of display noise flowing into the sensing voltage Vsen increases, which may deteriorate the SNR feature of the touch sensing value (TSV in FIG. 2).

The amount of display noise may be expressed as in Equation 1 below.

$$y[n]=h[n]*\Sigma_{i=1}^{N}Xi[n] \quad\quad\quad\quad \text{[Equation 1]}$$

Here, y[n] denotes the amount of display noise, n is a positive integer, and denotes a discrete time period or sequence of time. '*' denotes a convolution operation. h[n] denotes an inflow path of display noise. The display noise may flow by the parasitic capacitance between the gate lines GL and the source line SL and the common electrode COM, and the parasitic capacitance between the common electrode COM and the plurality of sensing electrodes RE and TX, and thus, the path through which display noise flows is unchangeable over time. Thus, the inflow path of display noise may be expressed as h[n], for example, an impulse response of the system.

N is a positive integer, and Xi[n] denotes a variable condition that affects the amount of display noise. The amount of display noise may be determined according to N variable conditions. The variable condition may include, for example, image data, a position of the driven gate line GL, a position of the driven driving electrode TE, a time difference between touch driving and display driving timing, a temperature of the touch screen 110, a level of driving signals (for example, driving voltages), driving states of driving circuits, etc., and may further include other factors.

As described above, as the thickness of the display panel 111 in FIG. 1 decreases and the touch sensing FRR increases, a display noise component may increase in the touch sensing signal Ssen and the touch sensing value TSV.

However, as described above with reference to FIG. 1, the touch screen system 100 according to example embodiments of the inventive concepts may previously measure the amount of display noise according to various image data and/or various driving states, that is, a display noise value according to variable conditions, store the amount of display noise in the DNT (11 in FIG. 1), and during touch sensing, find a display noise value from the DNT 11 based on the image data and/or the driving state in real time, and subtract the display noise value from the touch sensing value TSV. Accordingly, deterioration of touch sensing performance due to the display noise may be reduced or prevented.

Figure 4:
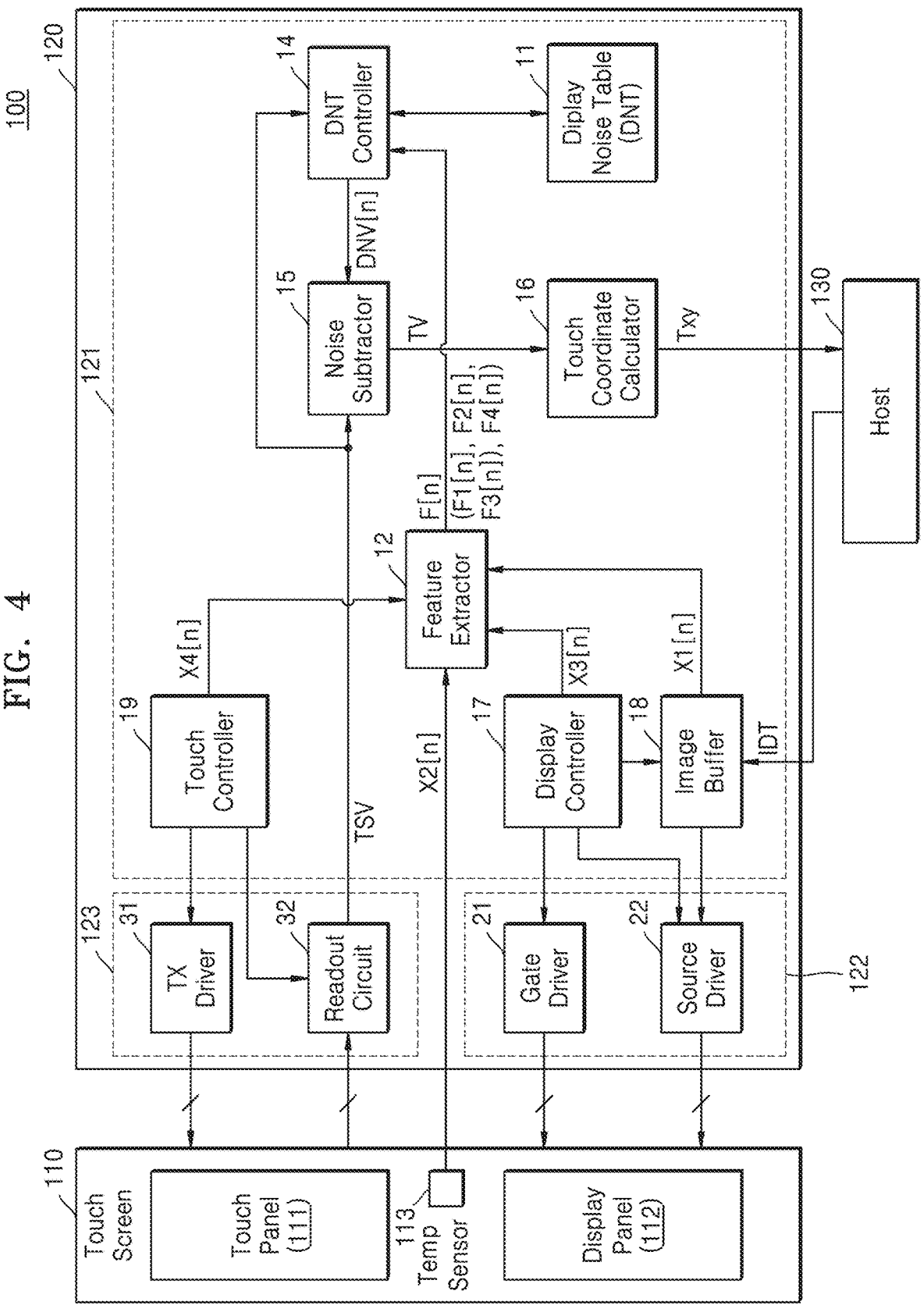
FIG. 4 is a block diagram illustrating in more detail a driving circuit according to example embodiments of the inventive concepts.

FIG. 4 is a block diagram illustrating in more detail the driving circuit 120 according to example embodiments of the inventive concepts. For convenience of description, the touch screen 110 is illustrated together. The description of the driving circuit 120 provided with reference to FIG. 1 may be applied to the present example embodiments, and redundant descriptions may be omitted.

Referring to FIG. 4, the driving circuit 120 may include the controller 121, the ADDI 122, and/or the ATDI 123.

The ADDI 122 may include the gate driver 21 and the source driver 22, and the ATDI 123 may include the transmission driver 31 and the readout circuit 32. Each of the ADDI 122 and the ATDI 123 may further include a voltage generator that generates voltages for driving the touch panel 111 or the display panel 112.

The controller 121 may include a display controller 17, an image buffer 18, a touch controller 19, the DNT 11, the feature extractor 12, and a DNT controller 14, a noise subtractor 15 and a touch coordinate calculator 16. The DNT controller 14, the noise subtractor 15, and the touch coordinate calculator 16 may constitute the touch processor 13 of FIG. 1. The controller 121 may further include a general-purpose digital circuit.

The display controller 17 may control operation timings and operation states of the gate driver 21 and the source driver 22, and may control an image buffer 18 to provide the image data IDT to the source driver 22 in synchronization with the operation timing.

The image buffer 18 may store the image data IDT received from the host 130, and provide the image data IDT to the source driver 22 in units of rows under the control of the display controller 17. The image buffer 18 may be implemented as a frame buffer or a line buffer. The frame buffer may store the image data IDT received from the host 130 in units of frames. For example, the frame buffer may store the image data IDT of one frame or the image data IDT of a plurality of frames. The line buffer may store the image data IDT in units of rows. For example, the line buffer may store one row or a plurality of rows of the image data IDT according to an order of the image data IDT received from the host 130. The image buffer 18 may be implemented as a volatile memory such as SRAM, DRAM, or a shift register, or a nonvolatile memory such as ReRAM and PRAM.

The touch controller 19 may control operation timing and operation states of the transmission driver 31 and the readout circuit 32.

The feature extractor 12 may extract (or calculate) a feature value F[n] from at least one of the image data IDT and/or the driving states of the touch screen 110. In example embodiments, the feature extractor 12 may receive the image data IDT from the image buffer 18 as a first variable condition X1[n], and extract a feature, that is, a first feature value F1[n], of the image data IDT from the first variable condition X1[n]. The feature extractor 12 may receive temperature information from the temperature sensor 113 as a second variable condition X2[n], and extract a feature, that is, a second feature value X2[n] of the temperature, from the second variable condition X2[n].

In example embodiments, the feature extractor 12 may receive a plurality of variable conditions, such as the first to fourth variable conditions X1[n], X2[n], X3[n], and X4[n], from the image buffer 18, the temperature sensor 130, the display controller 17, and the touch controller 19, and extract a plurality of feature values, that is, the first to fourth feature values F1[n], F2[n], F3[n], and F4[n], respectively corresponding to the first to fourth variable conditions X1[n], X2[n], X3[n]), and X4[n].

As described above, n denotes a discrete time period or an order in time, and may be an index indicating a current period among a plurality of periods (e.g., a plurality of horizontal display periods) within a display frame period (e.g., a period in which an image of one frame is displayed on the display panel 112). However, the inventive concepts are not limited thereto, and when the touch sensing frame rate is faster than the display frame rate, n may denote the current period among a plurality of periods within the touch sensing frame period (e.g., a period in which one frame is sensed on the touch panel 111).

The first variable condition X1[n] may include data of a row corresponding to an n-th row of the image data IDT, for example, a plurality of pixel values (or a plurality of pixel values corresponding to image signals displayed during an n-th period) of the n-th row of the image data IDT. The feature extractor 12 may receive a plurality of pixel values of one row of the image data IDT, for example, the n-th row, and extract (or calculate) a feature value represented by the plurality of pixel values as the first feature value F1[n]. For example, the first feature value F1[n] may be an average value of the plurality of pixel values, or a value (or a code) indicating a grayscale region corresponding to the average value.

In example embodiments, the feature extractor 12 may calculate a value representing a difference between an average of the plurality of pixel values of the n-th row and an average of a plurality of pixel values of an n−1th row, for example, a grayscale difference between the average grayscale of the n-th row and the average grayscale of the n−1th row, as the first feature value F1[n].

In example embodiments, the feature extractor 12 may receive a plurality of difference values according to a difference between the plurality of pixel values of the n-th row and the plurality of pixel values of an n−1th row of the image data IDT as the first variable condition X1[n]), and calculate an average value of the first variable condition X1[n]), that is, the plurality of difference values, or a value representing a grayscale region corresponding to the average value as the first feature value F1[n].

The second variable condition X2[n] may be the temperature received from the temperature sensor 113. For example, the temperature when an n-th row line is driven within one frame of the display panel 112 may be received as the second variable condition X2[n], and the feature extractor 12 may extract a value representing a temperature range corresponding to the received temperature as the second feature value F2[n]. For example, the DNT 11 may include a display noise value corresponding to each of low temperature, room temperature, and high temperature, and the feature extractor 12 may generate a value (or code) representing a temperature range including the temperature received from the temperature sensor 113 among the low temperature, the room temperature, and the high temperature as the second feature value F2[n].

The third variable condition X3[n] may be position information of the driven gate line. The fourth variable condition X4[n] may be position information (or order) of the driven driving electrode. At least one of timing information (e.g., a jitter of a first clock signal with respect to a reference clock signal) of the first clock signal used to drive the gate driver 21 and the source driver 22, information about a vertical blank period in one frame of a display, voltage levels of voltages used in the gate driver 21 and source driver 22, a frame rate of the display panel 112, and a driving state of the display panel 112 may be provided to the feature extractor 12 from the display controller 17 as a variable condition. In addition, at least one of timing information (e.g., a jitter of a second clock signal with respect to the reference clock signal) of the second clock signal used to drive the transmission driver 31 and the readout circuit 23, voltage levels of voltages, a frame rate of the touch panel 111, a voltage level of the driving voltage, and a driving state of the touch panel 111 may be provided to the feature extractor 12 from the touch controller 19 as a variable condition.

In example embodiments, when the controller 121 is integrated in one semiconductor chip, the jitter of the second clock signal with respect to the first clock signal may be provided to the feature extractor 12 as one variable condition.

The plurality of variable conditions X1[n], X2[n], X3[n], and X4[n] described above are factors affecting display noise that may be variable by each of the plurality of variable conditions X1[n], X2[n], X3[n], and X4[n] or a combination thereof.

The DNT controller 14 may read a display noise value DNV corresponding to the feature value F[n] from the DNT 11 based on the feature value F[n] received from the feature extractor 12, for example, the plurality of feature values F1[n], F2[n], F3[n], and F4[n] or read parameters for calculating the display noise value from the DNT 11 and calculate the display noise value DNV corresponding to the feature value F[n] based on the parameters. The DNT controller 14 may provide the display noise value DNV to the noise subtractor 15. In example embodiments, the DNT controller 14 may integrate a plurality of display noise values DNV and provide the integrated display noise values DNV to the noise subtractor 15.

For example, when the DNT 11 includes the plurality of display noise values DNV according to at least one variable condition, the DNT controller 14 may read the display noise value DNV corresponding to the feature value F[n] from the DNT 11. As another example, the DNT 11 may include a parameter with respect to a function (or a formula) representing the plurality of display noise values DNV, and the DNT controller 14 may read the parameters based on the feature value F[n], reconstruct the function, and calculate the display noise value DNV corresponding to the feature value F[n] using the function.

In example embodiments, the DNT controller 14 may measure display noise according to the image data IDT displayed on the touch screen 110 and/or the driving state of the touch screen 110 before a pre-measurement period, for example, a touch sensing operation of the touch screen system (100 in FIG. 1), and store the plurality of display noise values DNV according to a change in the image data IDT and/or the driving state of the touch screen 110 or the parameters of the function (or the formula) determined based on the plurality of display noise values DNV in the DNT 11. For example, in the pre-measurement period, the touch screen 110 may be driven, and the readout circuit 32 may generate the touch sensing value TSV. As the image data IDT and/or the driving state of the touch screen 110 vary, the plurality of touch sensing values TSV may be generated, and the DNT controller 14 may calculate the plurality of display noise values DNV from the plurality of touch sensing values TSV and store the plurality of display noise values DNV or the parameters of the function indicating the plurality of display noise values DNV in the DNT 11 as display noise information. Thereafter, during the touch sensing operation, the DNT controller 14 may read or calculate the display noise value corresponding to the feature value F[n] based on the display noise information stored in the DNT 11.

In example embodiments, the display noise information may be calculated at the manufacturing stage of the driving circuit 120 or the touch screen system 100 and stored in the DNT 11, and thereafter, the DNT controller 14 may periodically or aperiodically update the display noise information as described above during a process of using the touch screen system 100.

The noise subtractor 15 may receive the touch sensing value TSV and the display noise value DNV from the readout circuit 32 and the DNT controller 14, respectively, and subtract the display noise value DNV from the touch sensing value TSV to generate a touch value TV from which the display noise is removed. In example embodiments, the noise subtractor 15 may integrate the plurality of display noise values DNV to generate an integrated display noise value or receive the integrated display noise value from the controller 14, and subtract the integrated display noise value from the touch sensing value TSV.

The touch coordinate calculator 16 may receive touch values TV corresponding to respective nodes, for example, points where driving electrodes and receiving electrodes cross each other, of the touch panel 111 from the noise subtractor 15, and calculate a position where a touch input has occurred, that is, a touch coordinate Txy, from the touch values TV. The touch coordinate Txy may be provided to the host 130.

Figure 5B:
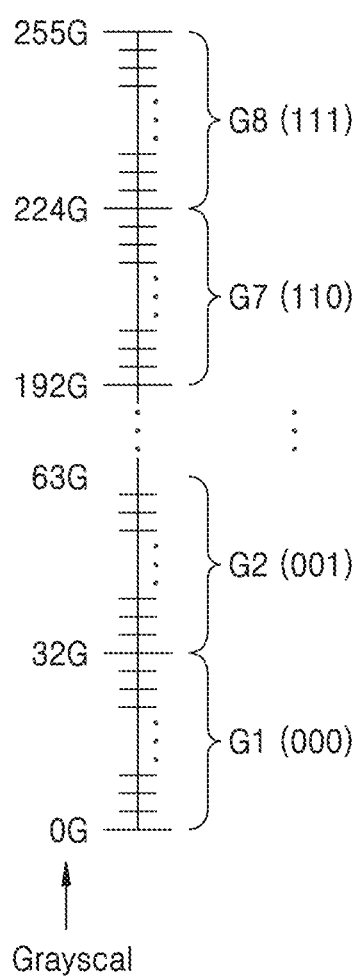

FIGS. 5A and 5B illustrate a method of extracting a feature value according to example embodiments of the inventive concepts. The method of extracting the feature value of FIGS. 5A and 5B represents a method of extracting the first feature value F1[n] according to image data, and may be performed by the feature extractor 12.

Referring to FIG. 5A, pixel values of one row from the image buffer 18, for example, first to fifteenth pixel values PV1 to PV15, may be provided to the corresponding source amplifier SA of the source driver 22. The pixel values of one row may also be provided to the feature extractor 12 as the first variable condition X1[n].

The feature extractor 12 may group the pixel values of one row into a plurality of subsets, such as a first subset, a second subset, and a third subset, and calculate an average value of the pixel values of each of the plurality of subsets. The feature extractor 12 may generate the first feature value F1[n] based on average values of each of the plurality of subsets.

In example embodiments, the feature extractor 12 may generate a combination of the average values of the plurality of subsets as the first feature value F1[n]. In some example embodiments, the average value (for example, an integer value of the average value) may represent one of a plurality of grayscale values that may be represented by a pixel value.

In example embodiments, as shown in FIG. 5B, the feature extractor 12 may group a plurality of grayscales, for example, 0 to 255 grayscales 0 G to 255 G, into a plurality of grayscale periods, for example, first to eighth grayscale periods G1 to G8, and generate the first feature value F1[n] based on the plurality of grayscale periods G1 to G8 indicated by the average values of the plurality of subsets. For example, when a grayscale indicated by the average value of a first subset is included in the first grayscale period G1, a grayscale indicated by the average value of a second subset is included in the seventh grayscale period G7, and a grayscale indicated by the average value of a third subset is included in the eighth grayscale period G8, the first feature value F1[n] may be expressed in a combination of respective codes, for example, 000, 110 and 111, of the first grayscale period G1, the seventh grayscale period G7, and the eighth grayscale period G8. The first feature value F1[n] may be '000 1110 111'.

In order to reflect the most accurate display noise according to the image data, the DNT (11 in FIG. 1) needs to include a plurality of display noise values according to a combination of all pixel values in one row. For example, when the number of source lines SL is K and the pixel value is M-bit data, the DNT 11 needs to include $2^{M \times N}$ display noise values according to the total number of $2^{M \times N}$ combinations. In addition, when the $2^{M \times N}$ display noise values are generated in the DNT 11 with respect to each of a plurality of receiving channels, a large storage space is required to store the DNT 11.

However, according to example embodiments of the inventive concepts, the feature extractor 12 may extract a feature value representing a specific range of each variable condition with respect to variable conditions, for example, the first feature value F1[n] according to the image data and the DNT 11 may include the display noise values according to feature values, and thus the amount of data, that is, the size, of the DNT 11 may be reduced.

With reference to FIGS. 5A and 5B, the method of extracting the first feature value F1[n] with respect to the image data is described as an example, but the inventive concepts are not limited thereto, and the feature extractor 12 may extract the feature value F[n] corresponding to the variable condition using a method suitable for each of the variable conditions.

For example, the feature extractor 12 may extract the second feature value F2[n] representing one of a plurality of temperature ranges, such as high temperature, low temperature, and room temperature, based on the received temperature, based on position information of a driven gate line, extract the third feature value F3[n] representing one corresponding to the position of the gate line among a plurality of position ranges on the display panel (112 in FIG. 1), for example, upper, middle, and lower portions, and based on the position information of the driven driving electrode, extract the fourth feature value F4[n] representing one of a plurality of position ranges on the touch panel (111 in FIG. 1), for example, left, middle, and right.

FIGS. 6A to 6E illustrate implementation examples of DNTs 11a to 11e according to example embodiments of the inventive concepts.

Referring to FIG. 6A, the DNT 11a may include the plurality of display noise values DNV according to the feature value F[n] of a variable condition. In example embodiments, the feature value F[n] may include code values set with respect to each of a plurality of variable conditions described above, and the plurality of display noise values DNV corresponding to respective code values may be stored in the DNT 11a.

Referring to FIG. 6B, the DNT 11b may include the plurality of display noise values DNV according to a combination of a plurality of feature values, for example, the first feature value F1[n] and the second feature value F2[n], corresponding to the plurality of variable conditions. For example, the first feature value F1[n] may be a value determined based on image data, for example, pixel values of one row. As described with reference to FIGS. 5A and 5B, the first feature value F1[n] may be a combination of average values of a plurality of subsets or a combination of code values of grayscale periods including the average values of the plurality of subsets. For example, the second feature value F2[n] may be a value determined based on temperature information of the touch screen (110 in FIG. 1). The second feature value F2[n] may be values representing high temperature, room temperature, and low temperature.

In example embodiments, the DNT 11b may include the plurality of display noise values DNV with respect to each of the plurality of feature values, for example, the first feature value F1[n] and the second feature value F2[n]. For example, the DNT 11a may include the plurality of display noise values DNV with respect to each of the first feature value F1[n] according to the image data and the second feature value F2[n] according to temperature, and the DNT controller 14 may read a first display noise value mapped to the first feature value F1[n] and a second display noise value mapped to the second feature value F2[n] from the DNT 11a, sum the first display noise value and the second display noise value, or calculate the first display noise value and the second display noise value based on a predetermined or alternatively, desired combination function, and calculate the display noise value DNV corresponding to a combination of the feature value F1[n] and the second feature value F2[n].

FIG. 6B shows an example in which the DNT 11b includes the plurality of display noise values DNV according to the combination of the first feature value F1[n] and the second feature value F2[n]. However, the inventive concepts are not limited thereto, and the DNT 11b may include the plurality of display noise values DNV according to a combination of at least two of the various variable conditions described above with reference to FIG. 4, for example, the first to fourth variable conditions X1[n] to X4[n].

Referring to FIG. 6C, the DNT 11c may include the plurality of display noise values DNV corresponding to some reference values among values that may be extracted as the feature value of the variable condition. For example, the feature value F[n] is a 4-bit code and may have 16 values from 0000 to 1111. As shown, the DNT 11c may include the plurality of display noise values DNV corresponding to some values of the feature value F[n], for example, 0000, 0010, 0100, 0110, . . . , 1100, 1111.

At this time, when 0011 is extracted as the feature value F[n] by the feature extractor 12, the DNT controller (14 in FIG. 4) may read two display noise values DNV corresponding to 0010 and 0100 adjacent to 0011 that is the feature value F[n] from the DNT 11, and based on the extracted two display noise values DNV, and calculate the display noise value DNV corresponding to 0011 that is the feature value F[n] using an interpolation method.

Referring to FIG. 6D, the DNT 11d may include the plurality of display noise values DNV corresponding to some reference values of the feature value F[n] that may be extracted by the feature extractor 12 and include parameters related to a function representing the display noise values DNV corresponding to values between some reference values. For example, the parameter may be a coefficient COFF of each order of the function. As shown in FIG. 6D, the coefficient COFF may include coefficients C1 and C2 of first and second terms of the function respectively.

When the feature value F[n] received from the feature extractor 12 does not match the feature value F[n] stored in the DNT 11d, the DNT controller 14 may read display noise values SDNV and coefficients COFF according to values adjacent to the feature value F[n] from the DNT 11d, reconstruct a function based on the display noise values SDNV and coefficients COFF, and calculate the display noise value DNV corresponding to the feature value F[n] based on the reconstructed function.

For example, when the feature value F[n] extracted from the feature extractor 12 is 0010, the DNT controller 14 may read '4' and '5' which are the display noise values DNV respectively corresponding to '0000' and '0100' adjacent to 0010' which is the feature value F[n], and '2' and '0' which are the coefficients COFF from the DNT 11d. The DNT controller 14 may reconstruct the function based on '4' and '5' and '2' which is the coefficient COFF of a second term, and calculate the display noise value DNV corresponding to '0010' from the function.

Figure 6E:
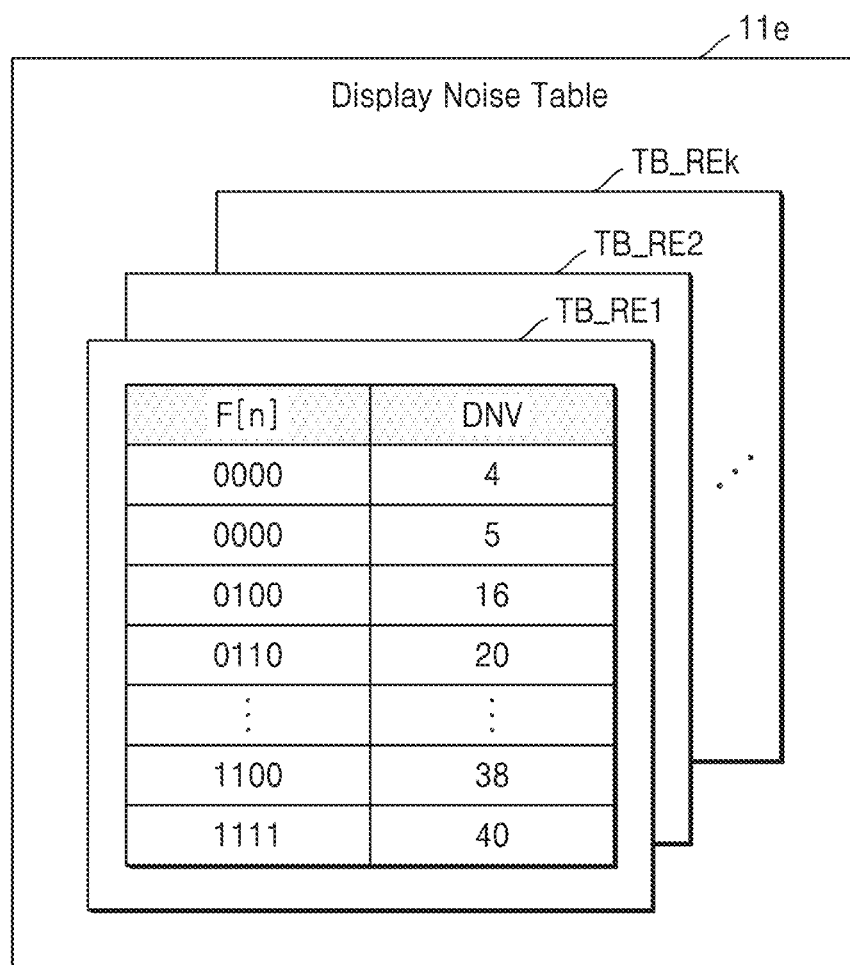

Referring to FIG. 6E, the DNT 11e may include a plurality of tables TB_RE1, TB_RE2, and TB_REk respectively corresponding to a plurality of channels, for example, a plurality of receiving electrodes RE1 to REk (k is an integer greater than or equal to 2). The DNTs 11a, 11b, 11c, and 11d described above with reference to FIGS. 6A to 6D may be implemented as a plurality of tables TB_RE1, TB_RE2, and TB_REk, respectively.

When generating a touch value based on a first sensing signal received through the first receiving electrode RE1, the DNT controller 14 may read or calculate the display noise value DNV by referring to the first table TB_RE1 and, when generating a touch value based on a second sensing signal received through the second receiving electrode RE2, the DNT controller 14 may read or calculate the display noise value DNV by referring to the second table TB_RE2.

Implementation examples of the DNTs 11a to 11e according to example embodiments of the inventive concepts are described with reference to FIGS. 6A to 6E. However, the configuration of the DNT 11 is not limited to the above-described example embodiments, and may be variously modified.

Figure 7:
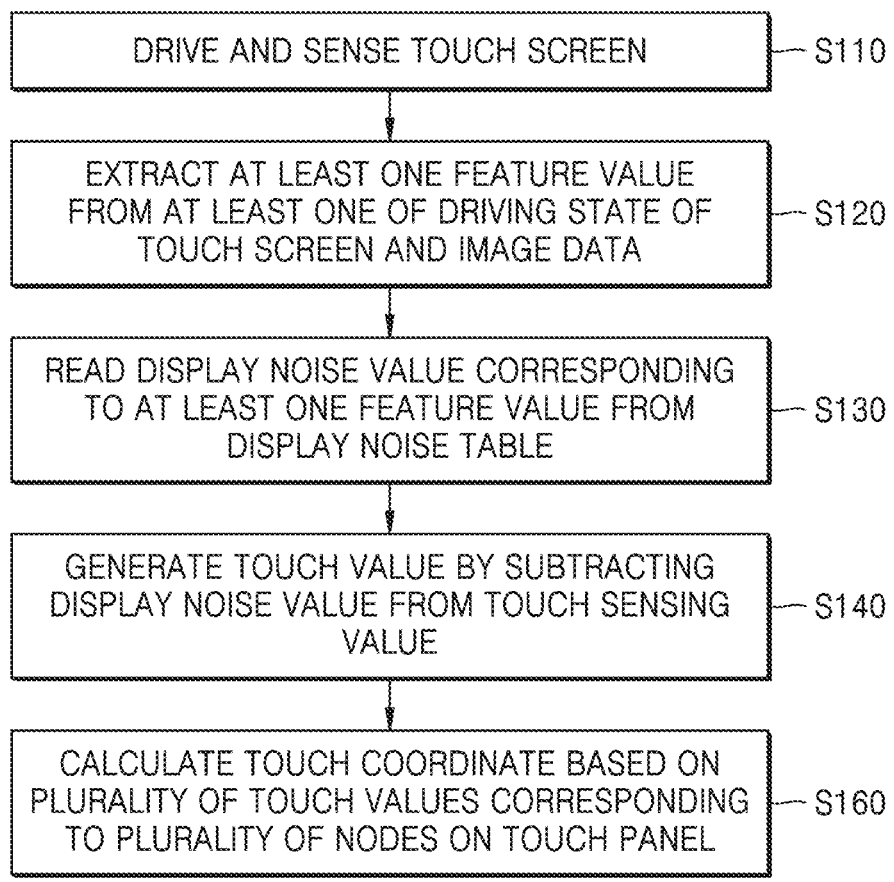
FIG. 7 is a flowchart illustrating an operating method of a driving circuit according to example embodiments of the inventive concepts.

FIG. 7 is a flowchart illustrating an operating method of the driving circuit 120 according to example embodiments of the inventive concepts. The operating method of FIG. 7 may be performed by the driving circuit 120 of the touch screen 110 of FIGS. 1 and 4. Accordingly, the description of the driving circuit 120 of FIGS. 1 and 4 above may be applied to the present example embodiments.

Referring to FIGS. 4 and 7, the driving circuit 120 may drive and sense the touch screen 110 (S110). The gate driver 21 and the source driver 22 may drive the display panel 112, the transmission driver 31 may drive the touch panel 111, and the readout circuit 32 may receive sensing signals from the touch panel 111. The readout circuit 32 may convert the sensing signals into touch sensing values.

The driving circuit 120 may extract (or calculate) the at least one feature value F[n] from at least one of a driving state of the touch screen 110 and the image data IDT (S120).

In example embodiments, the feature extractor 12 may receive pixel values of one row of one frame of the image data IDT from the image buffer 18 as the first variable condition X1[n], and extract the first feature value F1[n] from the first variable condition X1[n]. In some example embodiments, the pixel values of one row are pixel values provided to the source driver 22 in the same period, and in operation S110, the pixel values may be converted into image signals by the source driver 22 and displayed on the display panel 112.

In example embodiments, in addition to receiving the image data IDT from the image buffer 18, the feature extractor 12 may further receive at least one of other variable conditions, for example, the second to fourth variable conditions X1[n], X2[n], X3[n], and X4[n], from the temperature sensor 130, the display controller 17, and the touch controller 19, and may extract at least one of a plurality of feature values, for example, the first feature value F1[n] and the second to fourth feature values F2[n], F3[n], and F4[n], corresponding to at least one of a plurality of variable conditions, for example, the first variable condition X1[n] and the second to fourth variable conditions X2[n], X3[n], and X4[n].

The driving circuit 120 may read the display noise value DNV corresponding to at least one feature value from the DNT 11 (S130). The DNT controller 14 may receive the at least one feature value F[n], and based on the at least one feature value F[n], may read the display noise value DNV corresponding to the at least one feature value F[n] from the DNT 11. In example embodiments, when the DNT 11 includes parameters with respect to a function (or a formula) representing the plurality of display noise values DNV, the DNT controller 14 may read the parameters from the DNT 11, reconstruct the function based on the parameters, input the at least one feature value F[n] into the function, and calculate the display noise value DNV corresponding to the at least one feature value F[n].

Operations S120 and S130 may be performed simultaneously with operation S110 or may overlap in time.

The driving circuit 120 may generate a touch value by subtracting the display noise value DNV from the touch sensing value (S140). The noise subtractor 15 may subtract the display noise value DNV (or an integrated display noise value) received from the DNT controller 14 from the touch sensing value received from the readout circuit 32. Accordingly, the touch value TV from which display noise is removed may be generated.

The driving circuit 120 may calculate the touch coordinate Txy based on a plurality of touch values corresponding to a plurality of nodes on the touch panel 111 (S160). The touch coordinate calculator 16 may receive the plurality of touch values TV corresponding to a plurality of nodes on the touch panel 111 from the noise subtractor 15, and calculate the touch coordinate Txy based on the plurality of touch values TV. The touch coordinate Txy may be provided to the host 130.

Figure 8A:
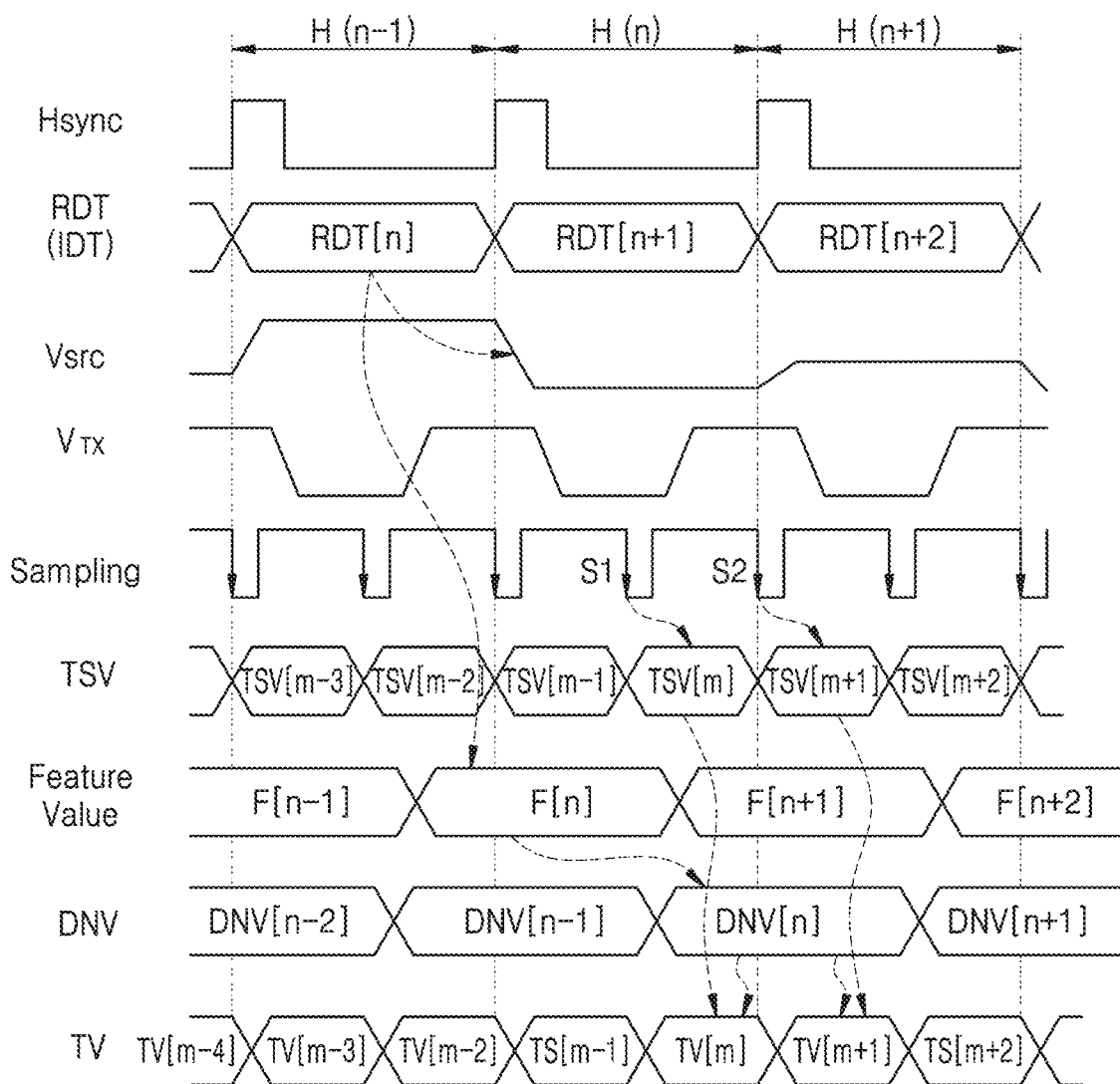
FIGS. 8A, 8B, and 8C are timing diagrams illustrating an operating method of a driving circuit according to example embodiments of the inventive concepts.
Figure 8B:
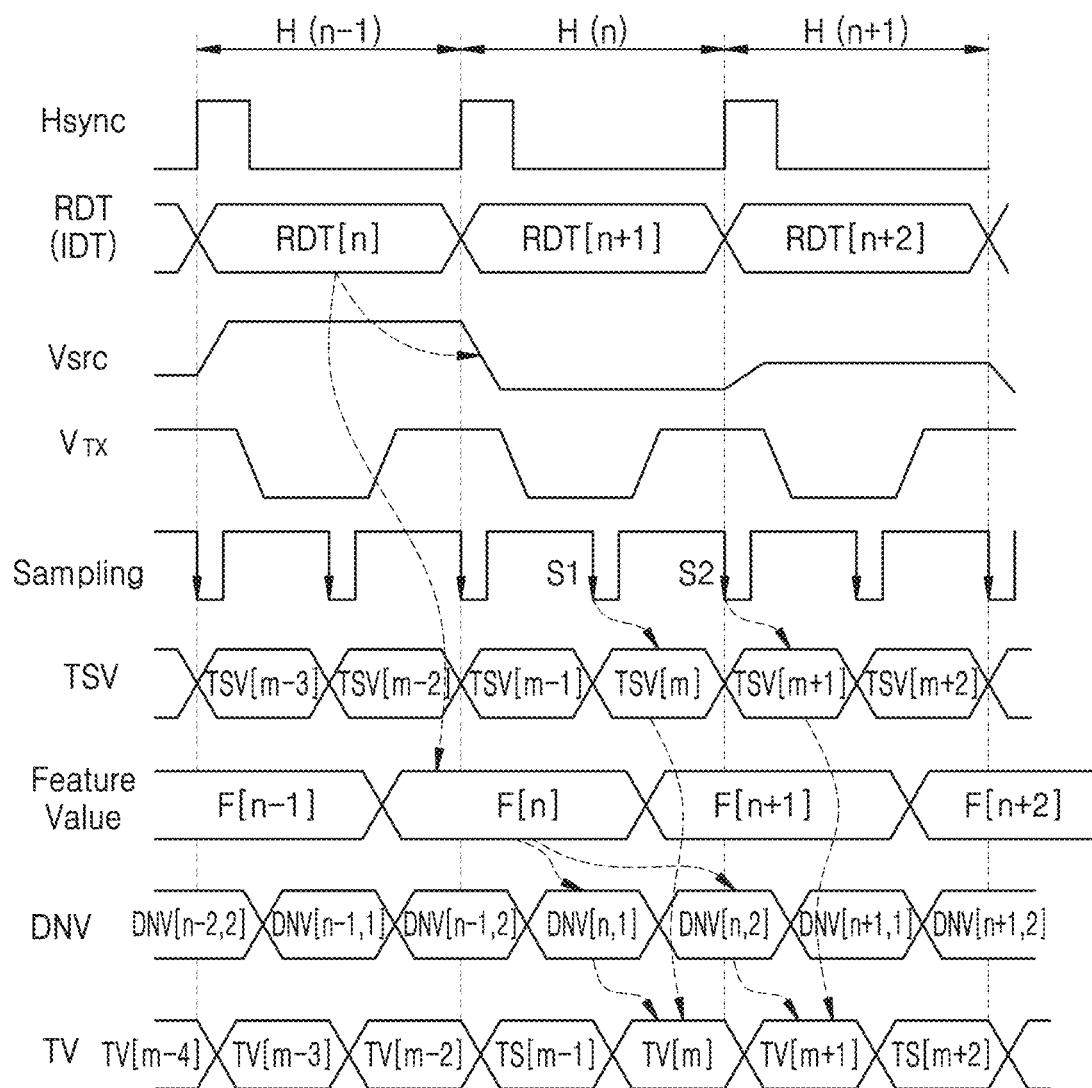
Figure 8C:
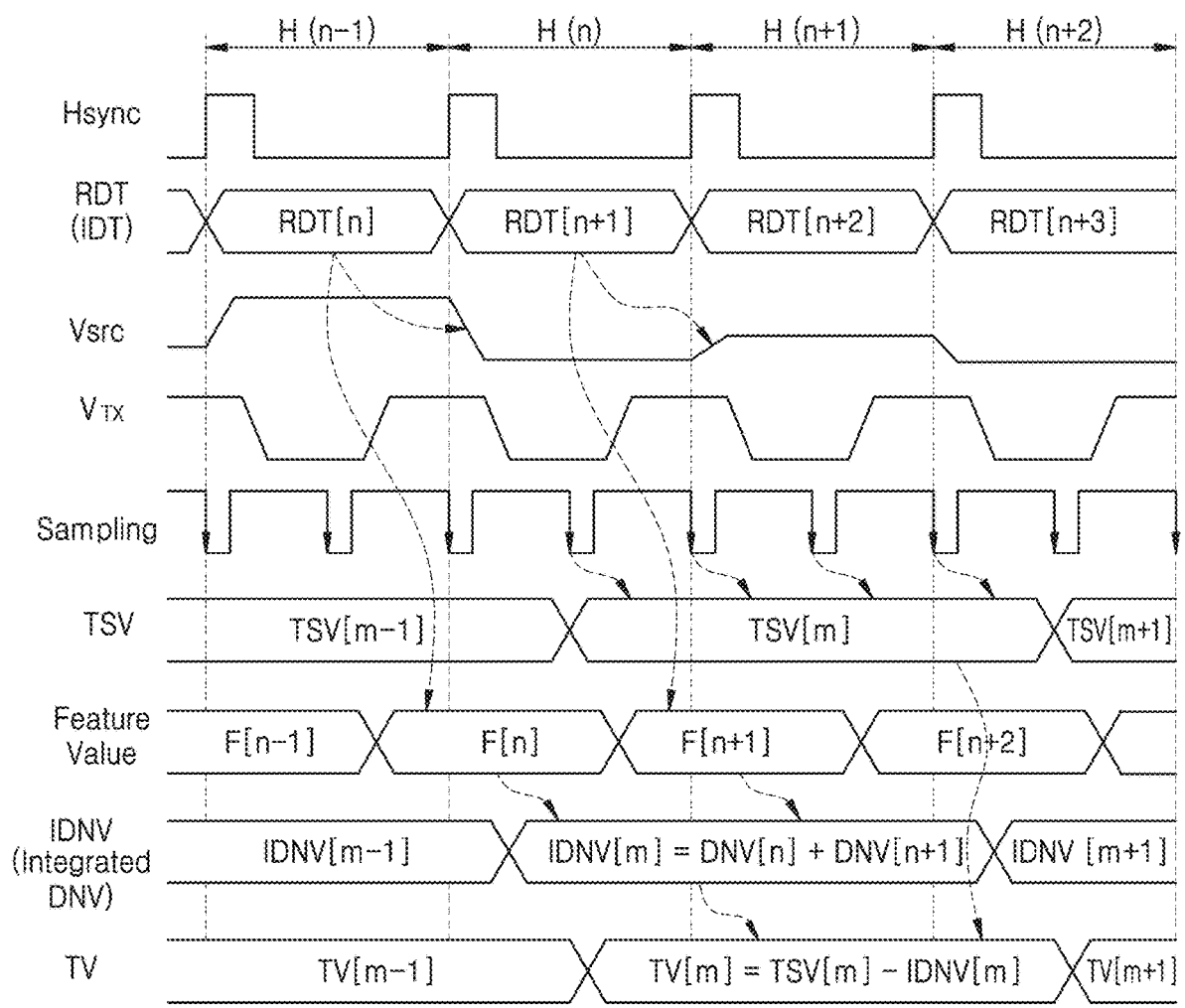

FIGS. 8A, 8B, and 8C are timing diagrams illustrating an operating method of the driving circuit 120 according to example embodiments of the inventive concepts. The operating method of FIGS. 8A to 8C may be performed by the driving circuit 120 of the touch screen 110 of FIGS. 1 and 4. An example in which the image data IDT is used as a variable condition is described.

Referring to FIG. 8A, driving of the display panel 112 may be performed in synchronization with the horizontal synchronization signal Hsync, and driving and sensing of the touch panel 111 may also be performed in synchronization with the horizontal synchronization signal Hsync. For example, the display controller 17 may control the operation timing of the source driver 21, the gate driver 22, and the image buffer 18 based on the horizontal synchronization signal Hsync, and provide the horizontal synchronization signal Hsync to the touch controller 19.

The image buffer 18 may provide data RDT[n] of the n-th row of the image data IDT in a horizontal period H(n−1) to the source driver 21 and the feature extractor 12. The data RDT[n] of the n-th row may include a plurality of pixel values of the n-th row.

The source driver 21 may convert the data RDT[n] of the n-th row into image signals, and output the image signals to source lines of the display panel 112 as source voltages Vsrc in a horizontal period H(n).

A driving voltage VTx may be applied to a driving electrode of the touch panel 111, a sensing signal received through a sensing electrode may be sampled, and the sampled sensing signal may be converted into the touch sensing value TSV (e.g. TSV[m−3] to TSV[m+2], m is a positive integer). In the horizontal period H(n), the driving voltage $V_{TX}$ may be sequentially applied to an m-th driving electrode and an m+1-th driving electrode, and sensing signals corresponding to points where the m-th driving electrode and m+1-th driving electrode are located may be sampled and sequentially converted into a touch sensing value TSV[m] and a touch sensing value TSV[m+1], respectively.

In FIG. 8A, a sampling rate is twice the frequency of the horizontal synchronization signal Hsync, but is not limited thereto, and the sampling rate may be faster or slower than twice the frequency of the horizontal synchronization signal Hsync.

The feature extractor 12 may generate a plurality of feature values (e.g. F[n] to F[n+2]) respectively corresponding to a plurality of raw data (e.g., RDT[n] to RDT[n+2]) based on the plurality of raw data. For example, the feature extractor 12 may receive the data of the n-th row, for example, the raw data RDT[n] as a variable condition, and extract the feature value F[n] (e.g., the n-th feature value) from the raw data RDT[n].

The DNT controller 14 may read or calculate a plurality of display noise values (e.g., DNV[n−2] to DNV[n+2]) respectively corresponding to the plurality of feature values (e.g. F[n] to F[n+2]) from the DNT 11. For example, the DNT controller 14 may read or calculate the display noise value DNV corresponding to the feature value F[n].

The noise subtractor 15 may calculate touch values TV[m] and TV[m+1] by respectively subtracting the display noise value DNV from the touch sensing values TSV[m] and TSV[m+1]. The noise subtractor 15 may sequentially generate the touch values TV[m] and TV[m+1] by respectively subtracting the display noise value DNV from the touch sensing values TSV[m] and TSV[m+1].

Referring to FIG. 8B, the DNT controller 14 may read or calculate the display noise value DNV corresponding to the plurality of feature values (e.g. F[n] to F[n+2]) and sampling times (e.g., S1 and S2) from the DNT 11.

For example, the feature extractor 12 may extract the feature value F[n] from the raw data RDT[n], and the DNT controller 14 may read or calculate the display noise value DNV from the DNT 11 based on the feature value F[n]. However, display noise generated by the raw data RDT[n] may be rapidly reduced in a horizontal period H(n), and thus, display noise included in the sensing signals sampled at the first sampling time S1 and the second sampling time S2 may be different. The DNT controller 14 may read or calculate the display noise value DNV corresponding to the sampling times S1 and S2 as well as the feature value F[n].

In example embodiments, the DNT controller 14 may determine the display noise value DNV as a display noise value DNV[n,1] corresponding to the first sampling time point S1, and generate a display noise value DNV[n,2] corresponding to the second sampling time S2 based on the display noise value DNV. For example, the DNT controller 14 may generate the display noise value DNV[n,2] corresponding to the second sampling time S2 by applying the display noise value DNV to an exponential function. In other example embodiments, display noise information representing display noise values corresponding to the first sampling time S1 and display noise information representing display noise values corresponding to the second sampling time S2 may be respectively stored in the DNT 11, and the DNT controller 14 may read or calculate the display noise value DNV[n,1] corresponding to the first sampling time point S1 and the display noise value DNV[n,2] corresponding to the second sampling time S2 from the DNT 11.

The noise subtractor 15 may calculate the touch value TV by subtracting the display noise value DNV from the touch sensing value TSV. For example, the noise subtractor 15 may sequentially generate the touch values TV[m] and TV[m+1] by respectively subtracting the display noise values DNV[n,1] and DNV[n,2] from the touch sensing values TSV[m] and TSV[m+1].

As described above, the driving circuit 120 may extract the feature value F[n] from the image data IDT, that is, the raw data RDT, to be displayed on the display panel 112 every horizontal period and determine the corresponding display noise value DNV based on the feature value F[n]. In addition, the driving circuit 120 may generate the touch value TV from which noise is removed by subtracting the display noise value DNV from the touch sensing value TSV corresponding to at least one sensing signal sampled in the horizontal period.

Referring to FIG. 8C, the sensing signal received through the sensing electrode every horizontal period may be sampled at least once (for example, twice), and the sampled sensing signal may be converted into the touch sensing value TSV (e.g., TSV[m−1] to TSV[m+1]). In some example embodiments, a plurality of sensing signals may be accumulated by sampling a plurality of times for a predetermined or alternatively, desired time, and the accumulated sensing signals (or accumulated sensing voltages generated by accumulating a plurality of sensing voltages corresponding to the plurality of sensing signals) may be converted into the sensing value TSV (e.g., TSV[m−1] to TSV[m+1]). For example, four sensing signals may be accumulated according to four sampling times in the horizontal periods H(n) and H(n+1), and the accumulated sensing signals (or the accumulated sensing voltages) may be converted into the touch sensing value TSV[m].

The feature extractor 12 may extract the feature values F[n] and F[n+1] from the raw data RDT[n] and RDT[n+1] respectively, and the DNT controller 14 may read or extract the display noise values DNV and DNV[n+1] from the DNT 11 based on the feature values F[n] and F[n+1] respectively. The DNT controller 14 (or the noise subtractor 15) may generate an integrated display noise value IDNV (e.g., IDNV[m−1] to IDNV[m+1]) by integrating the plurality of display noise values DNV corresponding to factors, for example, the plurality of raw data RDT, that cause noise in the plurality of sensing values converted to the touch sensing value TSV by sampling a plurality of times.

For example, the DNT controller 14 may generate an integrated display noise value IDNV[m] by integrating the display noise values DNV and DNV[n+1] respectively corresponding to the raw data RDT[n] and RDT[n+1] that cause noise in the plurality of sensing values in the horizontal periods H(n) and H(n+1).

The noise subtractor 15 may calculate the touch value TV by subtracting the integrated display noise value IDNV from the touch sensing value TSV. For example, the noise subtractor 15 may generate the touch value TV[m] by subtracting the integrated display noise value IDNV[m] from the touch sensing value TSV[m].

As described above, the driving circuit 120 may extract a feature value from the image data, that is, raw data RDT, to be displayed on the display panel 112 every horizontal period and determine the corresponding display noise value DNV based on the feature value. In addition, the driving circuit 120 may generate the touch value TV from which noise is removed by subtracting the integrated display noise value IDNV generated by integrating the plurality of display noise values DNV from the touch sensing value TSV generated based on the plurality of sensing signals sampled a plurality of times.

In FIGS. 8A to 8C, n denotes a time defined by the horizontal synchronization signal Hsync, for example, an order of one of a plurality of horizontal periods of a display frame, but is not limited thereto. In example embodiments, n may denote an order of one of a plurality of vertical periods (e.g., a period in which a plurality of driving electrodes are sequentially driven) of a time defined by a sampling period, for example, a touch sensing frame period.

In some example embodiments, the driving circuit 120 may extract a feature value from image data, that is, raw data, to be displayed on the display panel 112 every vertical period, and determine a corresponding display noise value based on the feature value. In addition, the driving circuit 120 may generate a touch value from which noise is removed by subtracting the display noise value from the touch sensing value corresponding to the sensing signal sampled in the vertical period, or as described with reference to FIG. 8C, the driving circuit 120 may generate a touch value from which noise is removed by generating a touch sensing value based on a plurality of sensing signals sampled a plurality of times, and subtracting the integrated display noise value generated by integrating a plurality of display noise values from the touch sensing value. In FIGS. 8A to 8C, an example in which image data is used as a variable condition is described, but the example embodiments of FIGS. 8A to 8C may be modified to example embodiments in which a plurality of feature values are extracted based on a plurality of variable conditions every horizontal period or every vertical period and a display noise value is read or calculated from the DNT 11 based on the plurality of feature values as described above with reference to FIGS. 1 and 4.

Figure 9A:
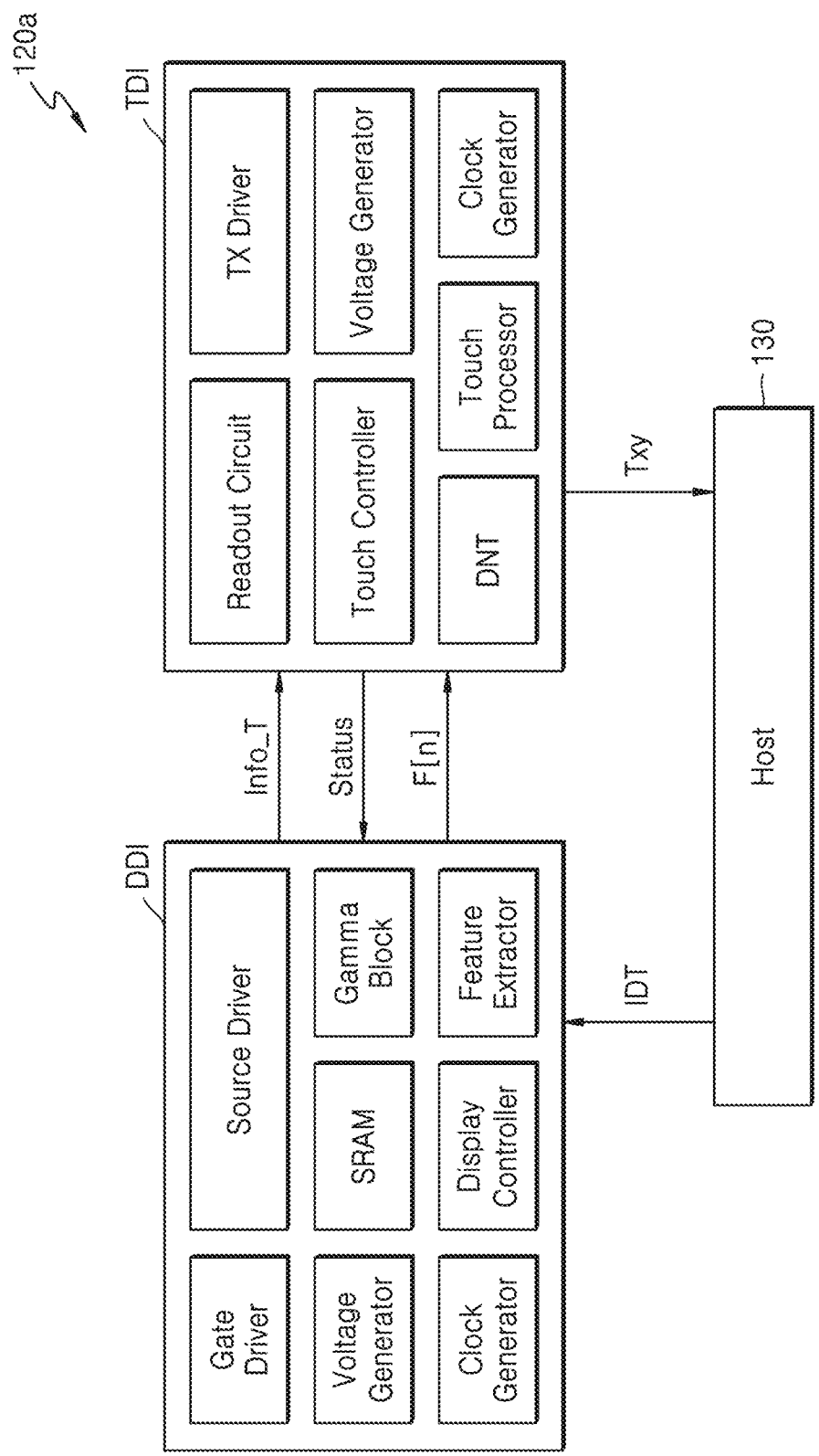
FIGS. 9A and 9B illustrate implementation examples of driving circuits according to example embodiments of the inventive concepts.
Figure 9B:
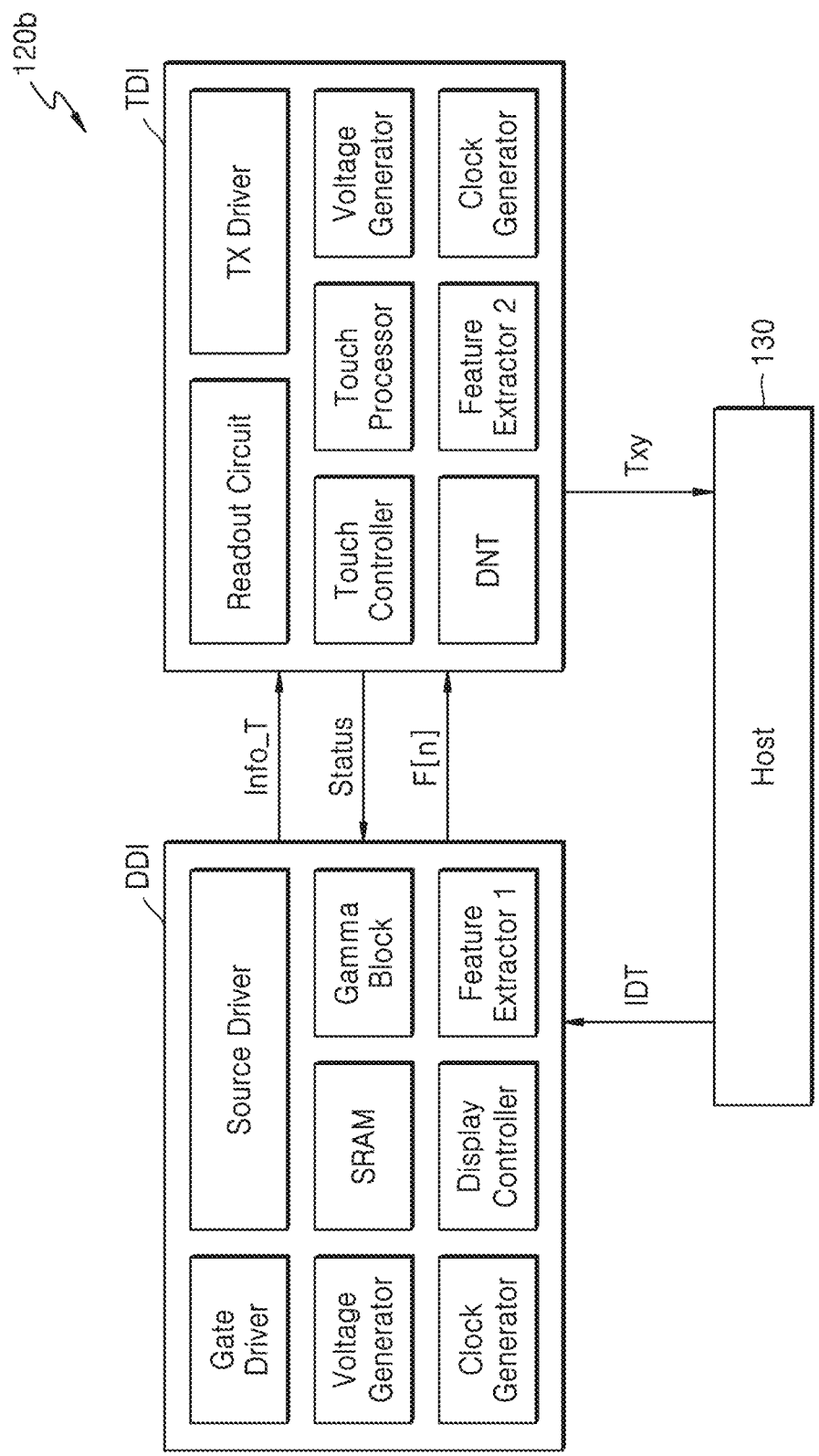

FIGS. 9A and 9B illustrate implementation examples of driving circuits 120a and 120b according to example embodiments of the inventive concepts.

Referring to FIGS. 9A and 9B, the driving circuits 120a and 120b may be identified as a display driving circuit DDI and a touch driving circuit TDI. In example embodiments, the display driving circuit DDI and the touch driving circuit TDI may be implemented as separate semiconductor chips. In example embodiments, at least one of the display driving circuit DDI and the touch driving circuit TDI may be implemented as a plurality of semiconductor chips. The display driving circuit DDI may receive the image data IDT from the host 130, and the touch driving circuit TDI may receive the touch coordinate Txy from the host 130. Although not shown, each of the display driving circuit DDI and the touch driving circuit TDI may receive a control signal from the host 130 and operate based on the control signal.

Referring to FIG. 9A, the display driving circuit DDI may include a clock generator, a display controller, a voltage generator, a gamma block, an SRAM, a gate driver, a source driver, and/or a feature extractor. In addition, the display driving circuit DDI may include interface circuits for communication with the host 130 and the touch driving circuit TDI. As a non-limiting example, one or more interface methods among interface methods such as SPI, I2C, I3C, etc. and high-speed serial interface (HSSI) methods such as MIPI, eDP, LVDS, USI-m, UPI-m, eRVDS, etc. may be applied to the interface circuit.

The clock generator, the display controller, the SRAM, and the feature extractor may be implemented as digital circuits, and a voltage generator, a gamma block, a gate driver, and a source driver may be implemented as analog circuits. The voltage generator, the gamma block, the gate driver, and the source driver may be referred to as analog driving circuits.

The display controller may control the overall operation of the display driving circuit DDI, and may control operation timings of the gate driver and the source driver.

The clock generator may generate a clock signal (referred to as a first clock signal) used inside the display driving circuit DDI, for example, the first clock signal provided to the source driver and the gate driver. For example, the clock generator may receive a reference clock signal from the host (130 of FIG. 1) and generate the first clock signal based on the reference clock signal.

The voltage generator may generate voltages used in the gate driver and the source driver, and the gamma block may generate a plurality of grayscale voltages corresponding to a plurality of grayscales that a pixel value may have, and provide the plurality of grayscale voltages to the source driver. SRAM may store image data, for example, SRAM may be provided as the image buffer (18 in FIG. 4). The image data of one frame stored in the SRAM may be provided to the source driver in units of raw data. In example embodiments, the SRAM may be replaced with a line buffer, and the line buffer may store the image data in units of raw data, and may provide stored data, such as the raw data, to the source driver. The raw data may include a plurality of pixel values corresponding to a plurality of pixels provided in one row of the display panel (112 in FIG. 1).

As described with reference to FIG. 2, the gate driver and the source driver may respectively drive the gate line and the source line under the control of the display controller. The gate driver may sequentially drive a plurality of gate lines of the display panel (112 in FIG. 2), and each of a plurality of source amplifiers provided in the source driver may output a selected grayscale voltage selected by the corresponding pixel value among the plurality of grayscale voltages received from the gamma block to the source line.

The feature extractor may receive the image data in units of raw data from the SRAM and extract the feature value F[n] from the raw data. The raw data provided from the SRAM to the source driver may also be provided to the feature extractor in the same period. The display driving circuit DDI may provide the feature value F[n] to the touch driving circuit TDI. In example embodiments, the feature extractor may extract a plurality of feature values from the image data and at least one display driving state (e.g., temperature information of the display panel, position information of the driven gate line, timing information of the first clock signal, information about a vertical blank period, voltage levels of voltages used in the gate driver and the source driver, an operation mode, a frame rate of the display panel, etc.) and provide the plurality of feature values to the touch driving circuit TDI.

The touch driving circuit TDI may include a touch controller, a clock generator, a transmission driver, a readout circuit, a voltage generator, a touch controller, a DNT, a touch processor, and/or a clock generator. In addition, the touch driving circuit TDI may include interface circuits for communication with the host 130 and the display driving circuit DDI.

The touch controller, the touch processor, the DNT, and the clock generator may be implemented as a digital circuit, and the readout circuit, the transmission driver, and the voltage generator may be implemented as an analog circuit. The readout circuit, the transmission driver, and the voltage generator may be referred to as an analog front end (AFE).

The touch controller may control the overall operation of the touch driving circuit DDI, and may control operation timings of the transmission driver and the readout circuit.

The clock generator may generate a clock signal (referred to as a second clock signal) used inside the touch driving circuit DDI, for example, the second clock signal provided to the transmission driver and the readout circuit. For example, the clock generator may receive a reference clock signal from the host (130 of FIG. 1) and generate the second clock signal based on the reference clock signal.

The voltage generator may generate voltages used in the transmission driver and the readout circuit. The transmission driver and the readout circuit may drive and sense the touch panel (111 of FIG. 1) based on the driving voltage and the reference voltage received from the voltage generator, and convert the sensing signal into a touch sensing value.

The touch processor may read or calculate a display noise value corresponding to the feature value F[n] from the DNT based on the feature value F[n] received from the display driving circuit DDI. The touch processor may generate a touch value from which noise is removed by subtracting the display noise value from the touch sensing value, and calculate a touch coordinate based on a plurality of touch values with respect to a plurality of nodes of the touch panel 111.

The display driving circuit DDI may provide timing information Info_T and the feature value F[n] to the touch driving circuit TDI. For example, the timing information Info_T may include a horizontal synchronization signal and a vertical synchronization signal of a display.

The touch driving circuit TDI may provide status information Status to the display driving circuit DDI as various information related to a touch sensing operation, and the status information may indicate whether analog circuits, such as the readout circuit and the transmission driver, for touch sensing in the touch driving circuit TDI are in a normal mode or a low power mode, and various types of information such as a touch sensing frequency may be included in the status information Status.

As described with reference to FIG. 9A, the display driving circuit DDI and the touch driving circuit TDI may be implemented as separate integrated circuits, and the display driving circuit DDI and the touch driving circuit TDI may transmit and receive the timing information Info_T and the status information Status and operate in synchronization with each other.

A plurality of display noise values according to the image data which is one of the dominant variable conditions affecting display noise or a plurality of display noise values according to the image data and at least one display driving state may be previously measured, and noise information indicating the plurality of display noise values may be previously stored in the touch driving circuit TDI as a DNT. During touch sensing, the display driving circuit DDI may extract and provide the feature value F[n] (or the plurality of feature values F[n] according to the image data and the at least one display driving state) with respect to the image data to the touch driving circuit TDI, and the touch driving circuit TDI may read or calculate a display noise value mapped to the feature value F[n] from the DNT and subtract the display noise value from the touch sensing value.

Referring to FIG. 9B, the display driving circuit DDI may include a clock generator, a display controller, a voltage generator, a gamma block, an SRAM, a gate driver, a source driver, and/or a first feature extractor (e.g. feature extractor 1). In example embodiments, the SRAM may be replaced with a line buffer. The touch driving circuit TDI may include a touch controller, a clock generator, a transmission driver, a readout circuit, a voltage generator, a touch controller, a DNT, a touch processor, a clock generator, and/or a second feature extractor (e.g. feature extractor 1).

The first feature extractor provided in the display driving circuit DDI may extract the feature value F[n] according to image data or extract the plurality of feature values F[n] according to the image data and at least one display driving state, and provide the at least one feature value F[n] to the touch driving circuit TDI.

The second feature extractor provided in the touch driving circuit TDI may extract at least one feature value from the driving state (e.g., position information of the driven driving electrode, the voltage level of voltages used for driving the transmission driver and the readout circuit, timing information of nth second clock signal, a frame rate of the touch panel, an operation mode, etc.) of at least one touch panel. The touch processor may read or calculate the display noise value corresponding to a plurality of feature values from the DNT, based on the at least one feature value F[n] (e.g., at least one of the first feature value F1[$n$] and the third feature value F4[$n$] in FIG. 4) received from the display driving circuit DDI and the at least one feature value (e.g., the fourth feature value F4[$n$] in FIG. 4) provided from the second feature extractor, that is, the plurality of feature values.

Not only the image data or the display driving state, but also touch driving state may affect display noise. Accordingly, as shown in FIG. 9B, the display driving circuit DDI and the touch driving circuit TDI may respectively include the first feature extractor and the second feature extractor, and the first feature extractor may extract at least one feature value from the image data IDT or the image data IDT and the display driving state, and the second feature extractor may extract at least one feature value from a touch driving state, and the touch processor may access the DNT based on the plurality of feature values provided from the first feature extractor and the second feature extractor and read or calculate the display noise value.

Figure 10:
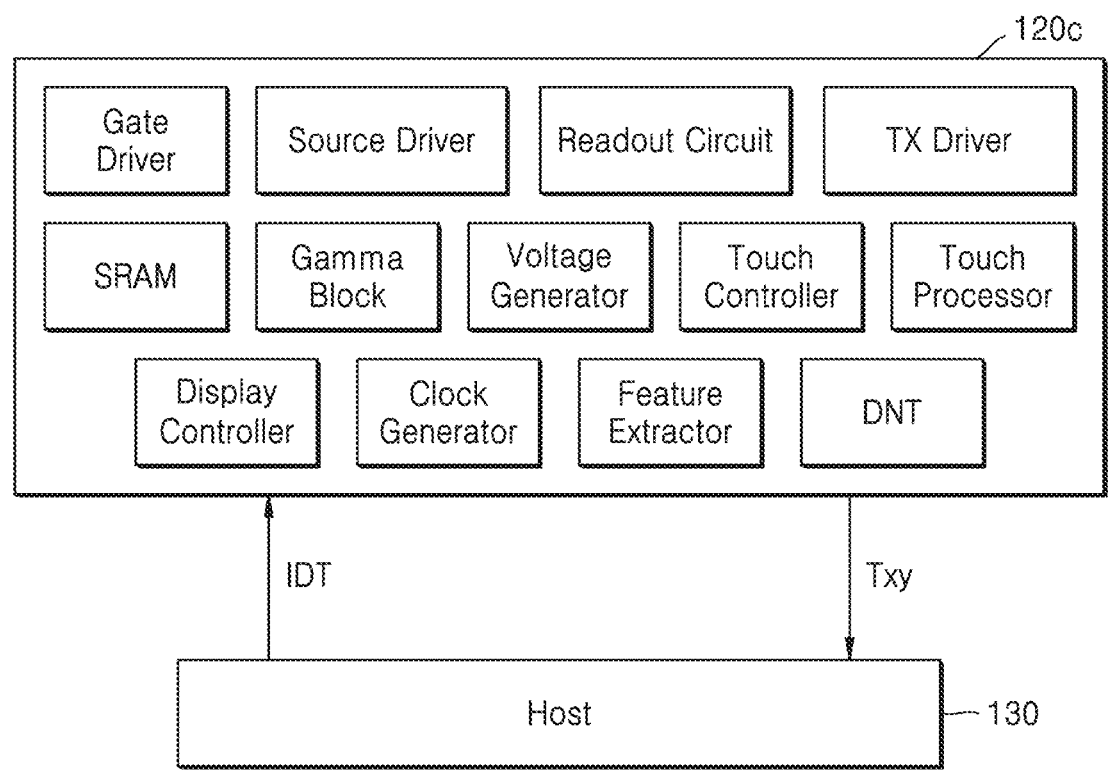
FIG. 10 illustrates an implementation example of a driving circuit according to example embodiments of the inventive concepts.

FIG. 10 illustrates an implementation example of the driving circuit 120c according to example embodiments of the inventive concepts.

Referring to FIG. 10, the driving circuit 120c may include a source driver, a gate driver, a gamma block, SRAM, and/or a display controller for driving the display panel (112 in FIG. 1), and may include a transmission driver, a readout circuit, a touch controller, and/or a touch processor for driving and sensing the touch panel (111 in FIG. 1). In example embodiments, the SRAM may be replaced with a line buffer. In addition, the driving circuit 120c may include a clock signal generator and a voltage generator that generate clock signals and voltages used in the driving circuit 120c. The driving circuit 120*c* may further include an interface circuit for communication with the host 130.

The driving circuit 120*c* also may include a DNT including display noise information according to at least one variable condition (e.g., a plurality of previously measured display noise values, or parameters of a formula or a function representing a plurality of display noise values) affecting display noise and a feature extractor that extracts a feature value for accessing the DNT from the at least one variable condition. In example embodiments, the DNT may be stored in a separate nonvolatile memory, for example, a resistive memory such as flash memory, ReRAM, PRAM, etc., and when the driving circuit 120*c* is booted, may be loaded onto the inner memory of the driving circuit 120*c*, such as SRAM, DRAM, etc. from the nonvolatile memory.

As described with reference to FIG. 10, the driving circuit 120*c* according to example embodiments of the inventive concepts may be integrated into one semiconductor chip, and may be referred to as the touch display driving circuit TDDI.

Figure 11A:
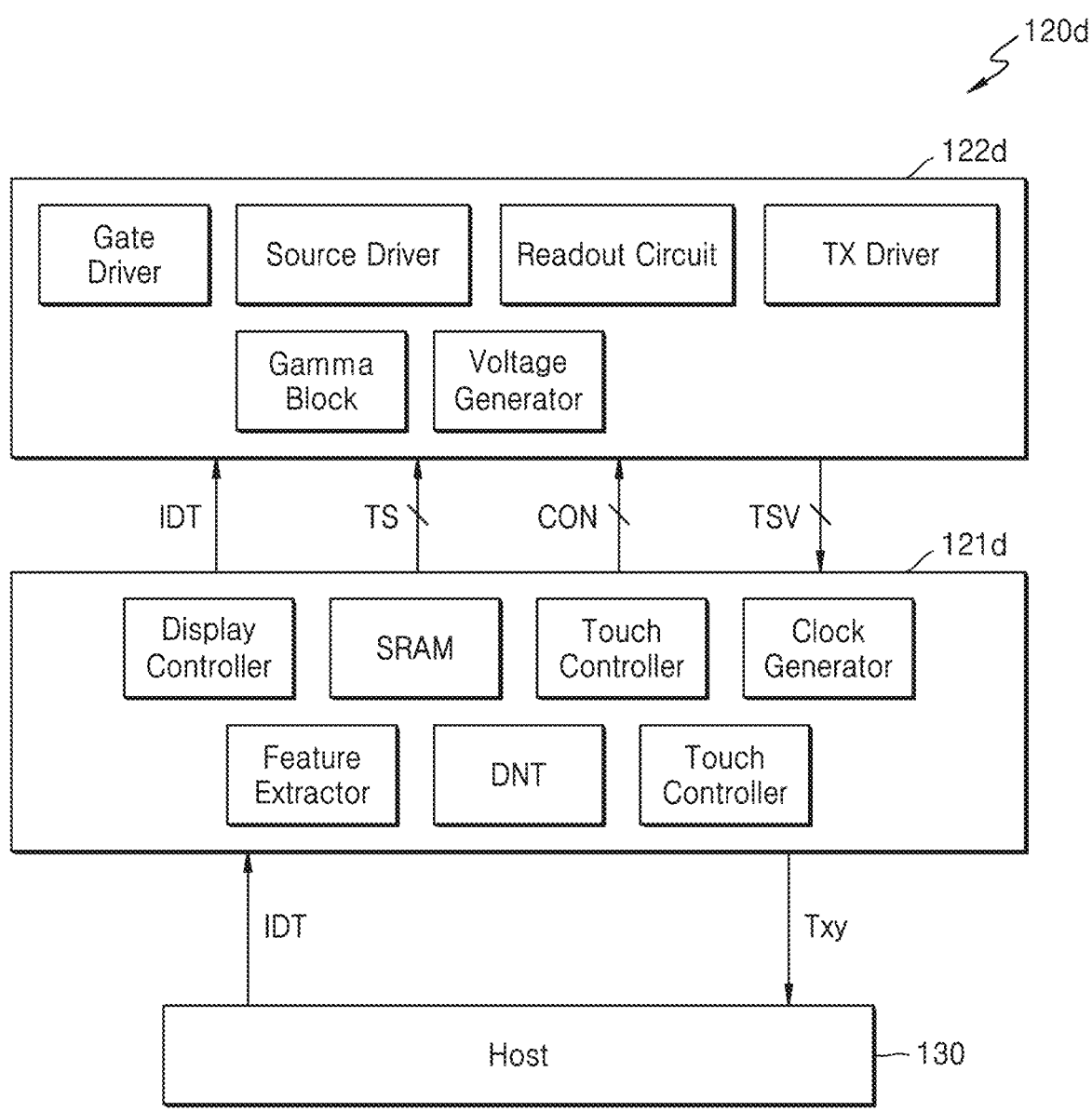
FIGS. 11A and 11B illustrate implementation examples of driving circuits according to example embodiments of the inventive concepts.
Figure 11B:
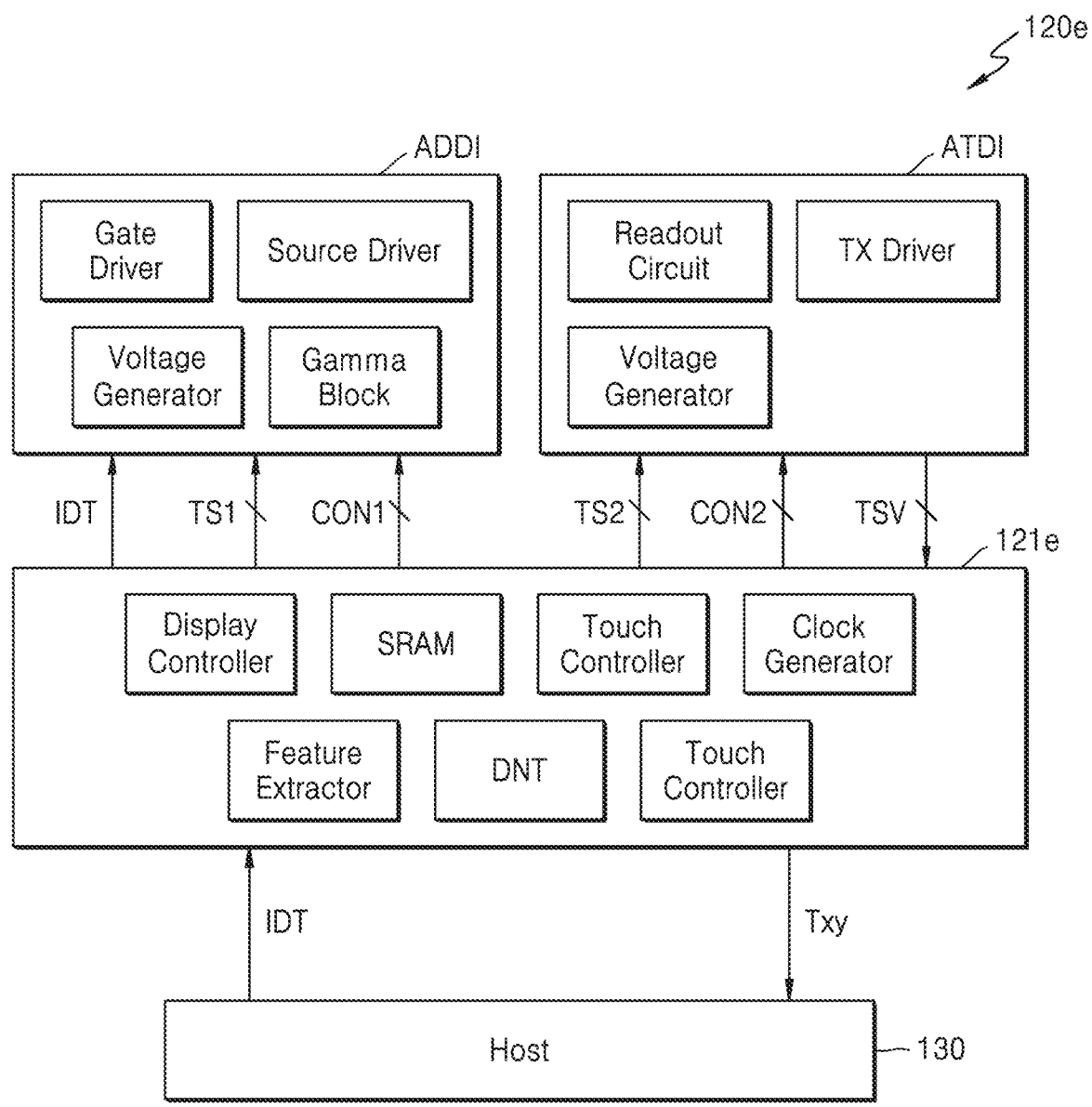

FIGS. 11A and 11B illustrate implementation examples of driving circuits 120*d* and 120*e* according to example embodiments of the inventive concepts.

Referring to FIG. 11A, the driving circuit 120*d* may include a controller 121*d* and a driving/sensing circuit 122*d*, and the controller 121*d* and the driving/sensing circuit 122*d* may be implemented as separate semiconductor chips.

The controller 121*d* may include a display controller, an SRAM, a touch controller, a clock generator, a feature extractor, a DNT, and/or a touch processor, which may be implemented as digital circuits. In example embodiments, the SRAM may be replaced with a line buffer. The controller 121*d* may further include interface circuits for communication with the host 130 and the driving/sensing circuit 122*d*.

The display controller, the SRAM, the touch controller, the clock generator, the feature extractor, the DNT, and/or the touch processor may be integrated into one semiconductor chip, and may communicate with each other through internal wiring of the semiconductor chip. Accordingly, information sharing may be easily performed. As an example, it may be easy to share signals, such as a timing signal, between the touch controller and the display controller, and it may be easy for the feature extractor to receive a display driving state and a touch driving state from the display controller and the timing controller.

The driving/sensing circuit 122*d* may include a gate driver, a source driver, a readout circuit, a TX driver, a gamma block, and/or a voltage generator, which may be implemented as analog circuits. The driving/sensing circuit 122*d* may further include interface circuits for communication with the host 130 and the controller 121*d*.

The driving/sensing circuit 122 may receive the image data IDT, a timing signal TS, and a control signal CON from the controller 121, and operate based on the timing signal TS and the control signal CON. The driving/sensing circuit 122 may display the image data IDT on the display panel (112 in FIG. 1), receive a sensing signal from the touch panel (111 in FIG. 1), convert the sensing signal into the touch sensing signal TSV and provide the touch sensing signal TSV to the controller 121.

Referring to FIG. 11B, the driving circuit 120*e* may include a controller 121*e*, the ADDI, and the ATDI, and the controller 121*e*, the ADDI, and/or the ATDI may be implemented as separate semiconductor chips.

Compared with FIG. 11A, analog circuits for driving the display panel (112 in FIG. 1) and analog circuits for driving the touch panel (111 in FIG. 1) may be implemented as separate semiconductor chips.

The ADDI may receive a first timing signal TS1 and a first control signal CON1 from a display controller of the controller 121*e*, and display the image data IDT on the display panel 112 based on the first timing signal TS1 and the first control signal CON1.

The ATDI may receive a second timing signal TS2 and a second control signal CON2 from a touch controller of the controller 121*e*, drive and sense the touch panel 111 based on the second timing signal TS2 and the second control signal CON2, and provide the touch sensing value TSV according to the sensing signal to the controller 121*e*.

As shown in FIGS. 11A and 11B, because digital circuits constituting the controller 121 may be integrated on a separate semiconductor chip, when a process shrink is applied to the digital circuits, the total area of the controller 121 and the driving circuit 120*d* may be reduced, and manufacturing cost may be reduced.

Any of the elements disclosed above may include or be implemented in processing circuitry (either separately or combined), such as hardware component(s), software component(s), and/or a combination of hardware component(s) and software component(s). For example, the device, the method, and the components described in example embodiments may be implemented using one or more general purpose computers or special purpose computers like a processor, a controller, an arithmetic logic unit (ALU), a digital signal processor, a microcomputer, a field programmable gate (FPGA), a programmable logic unit (PLU), a microprocessor, or any other device capable of executing and responding to instructions.

While the inventive concepts have been particularly shown and described with reference to example embodiments thereof, it will be understood that various changes in form and details may be made therein without departing from the spirit and scope of the following claims.

What is claimed is:

1. A touch screen system comprising:
    a touch screen comprising a display panel and a touch panel; and
    a touch screen driving circuit configured to drive the touch screen,
    wherein the touch screen driving circuit comprises:
        a display noise table (DNT) storing display noise information obtained by previously measuring a plurality of display noise values according to at least one of image data displayed on the touch screen and a driving state of the touch screen in a database;
        a feature extractor configured to extract a plurality of feature values from at least one of current image data to be displayed on the display panel and at least one of a current driving state of the touch screen;
        a DNT controller configured to output a display noise value corresponding to a combination of the plurality of the feature values from the DNT based on the plurality of feature values; and
        a processor configured to generate a touch value from which display noise is removed based on the display noise value.

2. The touch screen system of claim 1, wherein the touch screen driving circuit further comprises:
    a display driving circuit configured to generate a plurality of image signals corresponding to the current image data, drive the display panel based on the plurality of image signals, output image signals corresponding to data of an n-th row of current image data to the display panel in an n-th horizontal period distinguished by a horizontal synchronizing signal, wherein n being a positive integer;

a touch driving circuit configured to sequentially provide driving signals to a plurality of driving electrodes of the touch panel, sample sensing signals received from receiving electrodes of the touch panel, and converts the sampled sensing signals into one or more touch sensing values, the touch driving circuit samples the sensing signals one or more times in the n-th horizontal period.

3. The touch screen system of claim 2, wherein,
a sampling rate of the touch driving circuit is at least twice the frequency of the horizontal synchronization signal.

4. The touch screen system of claim 2, wherein,
the feature extractor extracts n-th plurality of feature values from the data of the n-th row and at least one of driving state of the n-th horizontal period of the touch screen.

5. The touch screen system of claim 4, wherein,
the DNT controller calculates an n-th display noise value caused by displaying the data of the n-th row on the display panel, by referring to the DNT based on the plurality of feature values, and
the processor subtracts the n-th display noise value from each of the one or more touch sensing values to generate one or more touch values from which the display noise is removed.

6. The touch screen system of claim 5, wherein,
the touch driving circuit samples first sensing signals received at a first timing and second sensing signals received at a second timing in the n-th horizontal period, and converts the sampled first sensing signals and the sampled second sensing signals into first touch sensing values and second touch sensing values, respectively,
the DNT controller calculates an n-th display noise value caused by displaying the data of the n-th row on the display panel, by referring to the DNT based on the plurality of feature values, and
the processor subtracts the n-th display noise value from each of the one or more touch sensing values to generate one or more touch values from which the display noise is removed.

7. The touch screen system of claim 4, wherein,
the touch driving circuit samples a first sensing signal received at a first time and a second sensing signal received at a second time in the n-th horizontal period, and the converts the sampled first sensing signal and sampled the second sensing signal into first touch sensing value and second touch sensing value, respectively,
the DNT controller calculates a first display noise value corresponding to the first time and a second display noise value corresponding to the second time, and
the processor subtracts the first display noise value from the first touch sensing value and subtracts the second display noise value from the second touch sensing value.

8. The touch screen system of claim 7, wherein,
the DNT controller reads the first display noise value from the DNT based on the plurality of feature values, and calculates the second display noise value based on the first display noise using an exponential function.

9. The touch screen system of claim 8, wherein,
the touch driving circuit accumulates sensing signals sampled in the n-th horizontal period and a (n+1)-th horizontal period, and converts the accumulated sensing signal into touch sensing value,
the DNT controller integrate an n-th display noise value and (n+1)-th display noise value, wherein the n-th display noise value is generated based on the n-th plurality of feature values, and the (n+1)-th display noise value is generated based on a (n+1)-th plurality of feature values, and
the processor subtracts the integrated display noise value from the touch sensing value.

10. A touch screen system comprising:
a touch screen comprising a display panel and a touch panel; and
a touch screen driving circuit configured to drive the touch screen,
wherein the touch screen driving circuit comprises
a display noise table (DNT) storing display noise information obtained by previously measuring a plurality of display noise values according to at least one of image data displayed on the touch screen and a driving state of the touch screen in a database,
a feature extractor configured to extract a plurality of feature values from at least one of current image data to be displayed on the display panel and at least one of a current driving state of the touch screen,
a DNT controller configured to read display noise values mapped to each of the plurality of feature values from the DNT and to perform an operation between the display noise values to generate the display noise value corresponding to a combination of the plurality of feature values, and
a processor configured to generate a touch value from which display noise is removed based on the display noise value.

11. The touch screen system of claim 10, wherein the touch screen driving circuit further comprises:
a display driving circuit configured to generate a plurality of image signals corresponding to the current image data, drive the display panel based on the plurality of image signals, output image signals corresponding to data of an n-th row of current image data to the display panel in an n-th horizontal period distinguished by a horizontal synchronizing signal, wherein n being a positive integer;
a touch driving circuit configured to sequentially provide driving signals to a plurality of driving electrodes of the touch panel, sample sensing signals received from receiving electrodes of the touch panel, and converts the sampled sensing signals into one or more touch sensing values, the touch driving circuit samples the sensing signals one or more times in the n-th horizontal period.

12. The touch screen system of claim 11, wherein,
a sampling rate of the touch driving circuit is at least twice the frequency of the horizontal synchronization signal.

13. The touch screen system of claim 11, wherein,
the feature extractor extracts n-th plurality of feature values from the data of the n-th row and at least one of driving state of the n-th horizontal period of the touch screen.

14. The touch screen system of claim 13, wherein,
the DNT controller calculates an n-th display noise value caused by displaying the data of the n-th row on the display panel, by referring to the DNT based on the plurality of feature values, and the processor subtracts the n-th display noise value from each of the one or more touch sensing values to generate one or more touch values from which the display noise is removed.

15. The touch screen system of claim 14, wherein, the touch driving circuit samples first sensing signals received at a first timing and second sensing signals received at a second timing in the n-th horizontal period, and converts the sampled first sensing signals and the sampled second sensing signals into first touch sensing values and second touch sensing values, respectively, the DNT controller calculates an n-th display noise value caused by displaying the data of the n-th row on the display panel, by referring to the DNT based on the plurality of feature values, and the processor subtracts the n-th display noise value from each of the one or more touch sensing values to generate one or more touch values from which the display noise is removed.

16. The touch screen system of claim 13, wherein, the touch driving circuit samples a first sensing signal received at a first time and a second sensing signal received at a second time in the n-th horizontal period, and the converts the sampled first sensing signal and sampled the second sensing signal into first touch sensing value and second touch sensing value, respectively, the DNT controller calculates a first display noise value corresponding to the first time and a second display noise value corresponding to the second time, and the processor subtracts the first display noise value from the first touch sensing value and subtracts the second display noise value from the second touch sensing value.

17. The touch screen system of claim 16, wherein, the DNT controller reads display noise values mapped to each of the plurality of feature values corresponding to the first time from the DNT, calculates the first display noise value corresponding to the combination of the plurality of feature values based on the display noise values, and calculates the second display noise value based on the first display noise value using an exponential function.

18. The touch screen system of claim 17, wherein, the touch driving circuit accumulates sensing signals sampled in the n-th horizontal period and a (n+1)-th horizontal period, and converts the accumulated sensing signal into touch sensing value, the DNT controller integrate an n-th display noise value and (n+1)-th display noise value, wherein the n-th display noise value is generated based on the n-th plurality of feature values, and the (n+1)-th display noise value is generated based on a (n+1)-th plurality of feature values, and the processor subtracts the integrated display noise value from the touch sensing value.

* * * * *